US009384317B1

(12) United States Patent
Salowe et al.

(10) Patent No.: US 9,384,317 B1
(45) Date of Patent: Jul. 5, 2016

(54) METHODS, SYSTEMS, AND ARTICLES OF MANUFACTURE FOR IMPLEMENTING ELECTRONIC DESIGNS USING CONSTRAINT DRIVEN TECHNIQUES

(71) Applicant: Cadence Design Systems, Inc., San Jose, CA (US)

(72) Inventors: Jeffrey S. Salowe, Los Gatos, CA (US); Satish Raj, Saratoga, CA (US); Olivier Pribetich, Vallauri (FR); Karun Sharma, San Jose, CA (US); Yinnie Lee, Campbell, CA (US); Gary Matsunami, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/231,713

(22) Filed: Mar. 31, 2014

Related U.S. Application Data

(60) Provisional application No. 61/899,148, filed on Nov. 1, 2013.

(51) Int. Cl.
*G06F 17/50* (2006.01)

(52) U.S. Cl.
CPC .................................. *G06F 17/5081* (2013.01)

(58) Field of Classification Search
CPC .................................. G06F 17/30; G06F 17/50
USPC .......................................................... 716/112
See application file for complete search history.

(56) References Cited

U.S. PATENT DOCUMENTS

| 8,375,348 | B1 | 2/2013 | Raj et al. | |
|---|---|---|---|---|
| 2006/0218516 | A1* | 9/2006 | McLain et al. | 716/10 |
| 2010/0169847 | A1* | 7/2010 | Gupta et al. | 716/2 |
| 2011/0084312 | A1* | 4/2011 | Quandt et al. | 257/202 |
| 2012/0023467 | A1* | 1/2012 | McSherry et al. | 716/112 |

OTHER PUBLICATIONS

SemiWiki.com. 'https://www.semiwiki.com/forum/content/1962-fixing-double-patterning-errors-20nm.html', printed on Sep. 17, 2014 (2 pages).
U.S. Appl. No. 12/981,062, filed Dec. 29, 2010.
U.S. Appl. No. 13/602,071, filed Aug. 31, 2012.
U.S. Appl. No. 13/602,069, filed Aug. 31, 2012.
U.S. Appl. No. 13/931,689, filed Jun. 28, 2013.
U.S. Appl. No. 13/931,627, filed Jun. 28, 2013.

(Continued)

*Primary Examiner* — Mohammed Alam
(74) *Attorney, Agent, or Firm* — Vista IP Law Group, LLP

(57) ABSTRACT

One aspect checks and prepares design data (202) based on design rule(s) to identify tracks for physical implementation of an electronic design. Structured physical implementation (204) is performed to implement at least a part of the electronic design by using the tracks under separate design rule(s). Structured physical implementation using the tracks under separate design rules result in correct-by-construction implementation results automatically satisfying the design rule(s), without performing additional design rule checking on the design rule(s). Additional physical implementation (206) may be optionally performed for portion(s) of the electronic design not implemented with the structured physical implementation. Layout fixing or optimization may be optionally performed to fix design rule violations in the additional physical implementation results, if any, or to optimize the additional physical implementation results.

32 Claims, 31 Drawing Sheets

(56) References Cited

OTHER PUBLICATIONS

U.S. Appl. No. 13/931,503, filed Jun. 28, 2013.
U.S. Appl. No. 13/931,707, filed Jun. 28, 2013.
U.S. Appl. No. 13/931,548, filed Jun. 28, 2013.
U.S. Appl. No. 13/980,744, filed Dec. 29, 2010.
U.S. Appl. No. 12/981,431, filed Dec. 29, 2010.
U.S. Appl. No. 14/044,836, filed Oct. 2, 2013.

* cited by examiner

METHODS, SYSTEMS, AND ARTICLES OF MANUFACTURE FOR IMPLEMENTING ELECTRONIC DESIGNS USING CONSTRAINT DRIVEN TECHNIQUES

CROSS REFERENCE TO RELATED APPLICATION(S)

This application claims the benefit of U.S. provisional patent application 61/899,148 filed on Nov. 1, 2013 and entitled "METHODS, SYSTEMS, AND ARTICLES OF MANUFACTURE FOR IMPLEMENTING ELECTRONIC DESIGNS USING CONSTRAINT DRIVEN TECHNIQUES". The content of the aforementioned U.S. provisional patent application is hereby expressly incorporated by reference for all purposes.

BACKGROUND

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

Many phases of these electronic design activities may be performed with computer aided design (CAD) tools or electronic design automation (EDA) systems. For example, an integrated circuit designer may use a set of layout EDA application programs, such as a layout editor, to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. The EDA layout editing tools are often performed interactively so that the designer can review and provide careful control over the details of the electronic design.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. The task of all routers is the same—routers are given some pre-existing polygons consisting of pins on cells and optionally some pre-routes from the placers to create geometries so that all pins assigned to different nets are connected by wires and vias, that all wires and vias assigned to different nets do not overlap, and that all design rules are obeyed. That is, a router fails when two pins on the same net that should be connected are open, when two pins on two different nets that should remain open are shorted, or when some design rules are violated during routing.

A layout file is created from the placement and routing process, which assigns logic cells to physical locations in the device layout and routes their interconnections. The physical layout is typically described as many patterned layers, and the pattern of each layer is described by the union of a set of polygons. The layout data set is stored, for example in GDSII ("Graphic Data System II") or OASIS ("Open Artwork System Interchange Standard") formats. Component devices and interconnections of the integrated circuit are constructed layer by layer. A layer is deposited on the wafer and then it is patterned using a photolithography process and an etch process.

Recent advances in semiconductor design and fabrication technologies in very deep submicron methodology (e.g., 20 nm or below) introduce additional complexities and challenges to the physical implementation tools (e.g., the placement tools, routing tools, and post-route physical implementation tools) to achieve a design rule clean electronic design, especially in supporting newly devised constraints while meeting the performance goals for these physical implementation tools.

Thus, there exists a need for methods, systems, and articles of manufacture for implementing electronic designs using constraint driven techniques.

SUMMARY

Disclosed are method(s), system(s), and article(s) of manufacture for implementing electronic designs using constraint driven techniques in various embodiments. Various embodiments described herein provide solutions to physical implementation, violation fixing, and design optimization (collectively physical implementation hereinafter) methodologies for electronic designs with to comply with newly devised constraints, design rules, and requirements (collectively design rule or design rules hereinafter) while meeting the performance goals or requirements. The disclosed methodologies include the use of data checking and preparation based at least in part upon a first set of design rules before initiating the physical implementation of an electronic design and performing structured physical implementation with a first implementation strategy on at least a part of the electronic design.

By using the results of data checking and preparation in implementing the at least a portion of the electronic design with the first physical implementation strategy, the resulting physical design automatically satisfies the first set of design rules, without performing any subsequent design rule checking for the first set of design rules. In other words, the implemented portion of the electronic design is correct-by-construction with respect to at least the first set of design rules. Some exemplary design rules that may be considered in data checking and preparation and automatically satisfied may include, for example but not limited to, the double patterning odd cycle or odd loop rule(s), the forbidden edge pitch range rule(s), the minimum area rule, the minimum spacing rule(s), the cut-to-metal rule(s), other applicable rules, or any combinations.

These embodiments consider the first set of design rules during the data checking and preparation stage and relieve the physical implementation tools (e.g., the placement tool(s), the router(s), the post-route checking, fixing, or optimization tool(s), etc.) from the burden of considering, checking, or being aware of these complex design rules during physical implementation and thus greatly improves the runtime of these physical implementation tools. These methodologies may further optionally include the performance of additional physical implementation for a portion of the electronic design with a second implementation strategy and subsequently performing layout fixing or optimization after this optional, additional physical implementation.

Some embodiments are directed at a method for implementing electronic designs using constraint driven techniques. In these embodiments, the method first identifies a set of design rules and checks and prepares data related to the electronic design of interest. The set of design rules may include, for example but not limited to, the double patterning odd cycle or odd loop rule(s), the forbidden edge pitch range rule(s), the minimum area rule, the minimum spacing rule(s), the cut-to-metal rule(s), other applicable rules, or any combinations. The method further identifies or determines a set of tracks, such as routing tracks, based at least in part upon the set of design rules. That is, the method identifies or determines the set of tracks with a uniform pitch or non-uniform pitches by factoring in the set of design rules in the identification or determination of the set of tracks.

The method may then use the set of tracks to physically implement at least a portion of the electronic design by referencing a set of one or more separate design rules. An exemplary separate design rule may include an on-track design rule requiring all interconnects be implemented in such a way to be aligned with some tracks in at least a part of the electronic design. The portion of the electronic design thus physically implemented automatically satisfies the set of design rules, without performing any subsequent design rule checking for the set of design rules. In other words, the implemented portion of the electronic design is correct-by-construction with respect to at least the first set of design rules.

The method may further determine whether there exists another portion of the electronic design that has not been implemented by using the tracks under the set of one or more separate design rules. If the determination is affirmative, the method may further perform additional physical implementation for this unimplemented portion of the electronic design, without regard to the set of one or more separate design rules. The portion thus implemented may or may not cause one or more violations of the set of design rules. If there is a violation of the set of design rules due to, for example, not using the identified or determined tracks, the method may further perform a layout fixing process to correct the violation. In addition or in the alternative, the method may also perform an optimization process on the additional physical implementation results to further improve or optimize the electronic design.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

More details of various aspects of the methods, systems, or articles of manufacture for implementing electronic designs using constraint driven techniques are described below with reference to FIGS. 1-6.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 2 illustrates a high-level flow diagram for implementing electronic designs using constraint driven techniques in some embodiments.

FIG. 2D illustrates a more detailed flow diagram for implementing electronic designs using constraint driven techniques in some embodiments.

FIGS. 5I-1 and 5I-2 illustrate two other approaches for checking or preparing data of the exemplary layout based on one or more characteristics of a pin illustrated in FIGS. 5E-F in some embodiments.

FIGS. 5J-1 and 5J-2 illustrate an approach for fixing an odd-cycle path design rule violation in a simplified layout in some embodiments.

DETAILED DESCRIPTION

Figure 1:
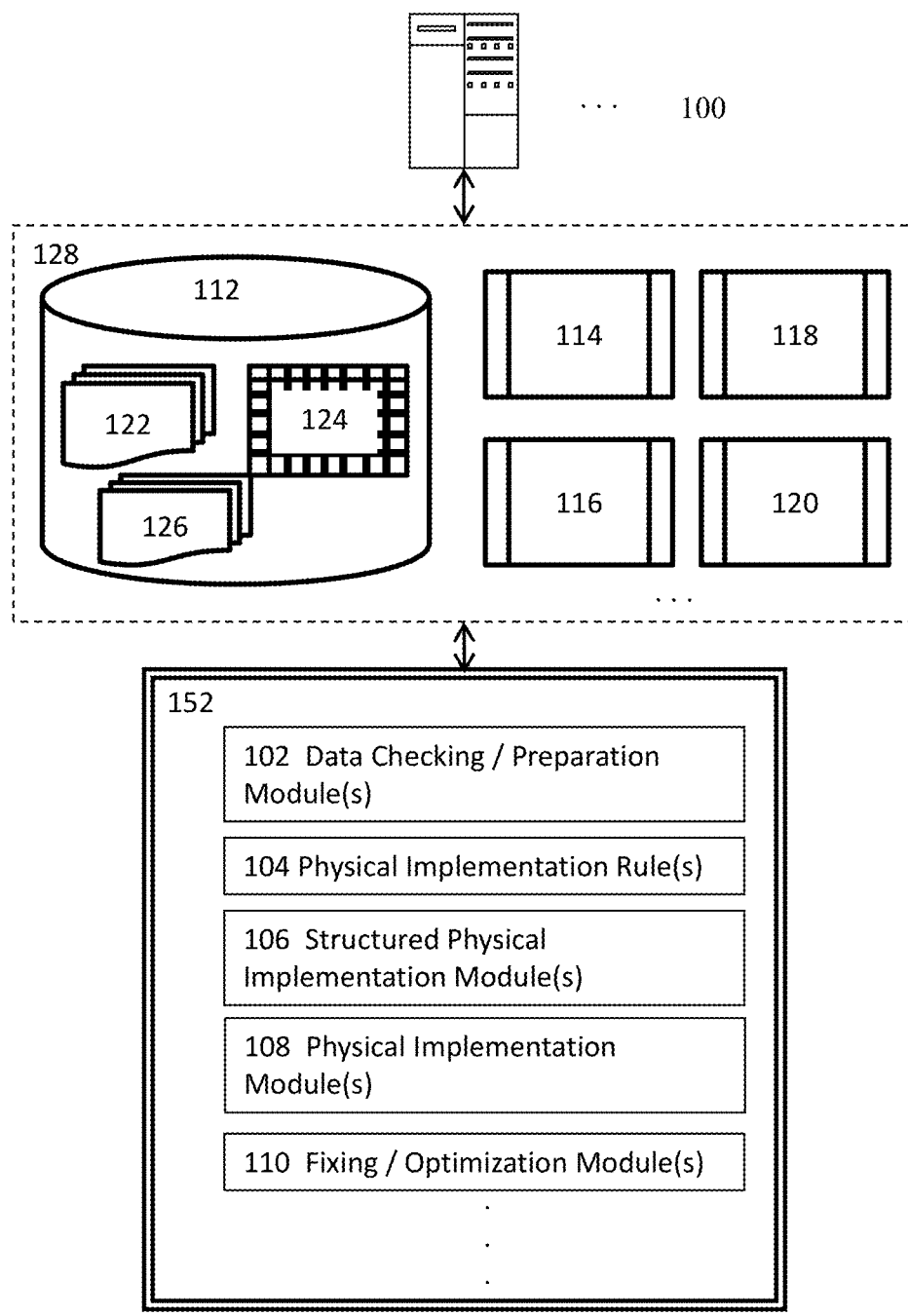
FIG. 1 illustrates a high level block diagram for an exemplary system for implementing electronic designs using constraint driven techniques in some embodiments.

Various embodiments of the invention are directed to a methods, systems, and articles of manufacture for implementing electronic designs using constraint driven techniques. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the claimed invention will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for implementing electronic designs using constraint driven techniques in one or more embodiments. Some embodiments are directed at a method for implementing electronic designs using constraint driven techniques. In these embodiments, the method or system first identifies a set of design rules and checks and prepares data related to the electronic design of interest. The set of design rules may include, for example but not limited to, the double patterning odd cycle or odd loop rule(s), the forbidden edge pitch range rule(s), the minimum area rule, the minimum spacing rule(s), the cut-to-metal rule(s), other applicable rules, or any combinations.

The method or system further identifies or determines a set of tracks, such as routing tracks, based at least in part upon the set of design rules. That is, the method or system identifies or determines the set of tracks with a uniform pitch or non-uniform pitches by factoring in the set of design rules in the identification or determination of the set of tracks. The method or system may then use the set of tracks to physically implement at least a portion of the electronic design by referencing a set of one or more separate design rules. An exemplary separate design rule may include an on-track design rule requiring all interconnects be implemented in such a way to be aligned with some tracks in at least a part of the electronic design. The portion of the electronic design thus physically implemented automatically satisfies the set of design rules, without performing any subsequent design rule checking for the set of design rules. In other words, the implemented portion of the electronic design is correct-by-construction with respect to at least the first set of design rules.

The method or system may further determine whether there exists another portion of the electronic design that has not been implemented by using the tracks under the set of one or more separate design rules. If the determination is affirmative, the method or system may further perform additional physical implementation for this unimplemented portion of the electronic design, without regard to the set of one or more separate design rules. The portion thus implemented may or may not cause one or more violations of the set of design rules. If there is a violation of the set of design rules due to, for example, not using the identified or determined tracks, the method or system may further perform a layout fixing process to correct the violation. In addition or in the alternative, the method or system may also perform an optimization process on the additional physical implementation results to further improve or optimize the electronic design.

In checking and preparing the data related to the electronic design, the method or system may identify boundary pins and instance pins in a region of interest of the electronic design to identify or determine the set of tracks. The method or system may select the set of tracks from the manufacturing grids provided by the manufacturers. In some embodiments, the tracks that intersect or are aligned with the most number of instance pins in the region of interest are identified and selected for the set. The data checking and data preparation process or module may further identify one or more boundary pins that do not intersect or are not aligned with the tracks in the set of tracks and perform various processes to bring these one or more boundary pins into alignment with some tracks. In some other embodiments, the method or system may utilize a trackless physical implementation methodology to implement the physical electronic design without regard to the tracks. More details of various aspects of the methods, systems, or articles of manufacture for implementing electronic designs using constraint driven techniques are described below with reference to FIGS. 1-6.

FIG. 1 illustrates a high level block diagram for an exemplary system for implementing electronic designs using constraint driven techniques in some embodiments. In one or more embodiments, the system for implementing electronic designs using constraint driven techniques may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a global routing engine and/or a detail routing engine 114, a layout editor 116, a design rule checker 118 that may work individually, separately from or in conjunction with other modules, one or more verification engines 120, a floorplanner, etc. The one or more computing systems 100 may further write to and read from a local or remote volatile or non-volatile computer accessible storage medium 112 that stores thereupon data or information such as, but not limited to, one or more databases (124) such as schematic design database(s) or physical design database(s), libraries, data, rule decks for design rules, constraints, requirements, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprise data checking and data preparation module(s) 102 to, for example, check and prepare various data related to an electronic design of interest, one or more physical implementation rule modules 104 to, for example, store, check, apply, or discard one or design rules, one or more structured physical implementation modules 106 to implement physical designs of electronic designs, one or more fixing or optimization modules to fix design rule violations or to improve or optimize at least a portion of a design.

The computing system may further include one or more physical implementation modules 108 to implement physical designs of electronic designs in conjunction with, for example, one or more analysis or determination modules to perform various analyses or determinations such as constraint or design rule analysis, or to make various determinations either in an offline mode while the electronic design implementation process is halted or stopped or in an online mode while the electronic design is being implemented. The one or more analysis or determination modules may further communicate its analysis or determination results to other tools, modules, or processes to guide the electronic design process. In some embodiments, the one or more computing systems 100 may, either directly or indirectly through various resources 128 to invoke various software, hardware modules or combinations thereof 152 that may comprise a pre-processing module 110 to pre-process the data of various design components in an electronic design.

For example, the method or system may interactively check whether an electronic design complies with various constraints or design rules (collectively constraints), such as some net-based spacing constraints that impose some limitations on the spacing between two nets, in a nearly real-time manner while the electronic design is being created in some embodiments. In these embodiments, the disclosed method or system uses the connectivity information provided by a connectivity engine or assigned by a designer to present feedback to a user as to whether a newly created object or a newly modified object complies or violates certain relevant constraints in an interactive manner or in nearly real-time without having to perform such constraints checking in batch mode. More details about the aforementioned modules will become clear and self-explanatory in the remainder of the description with reference to various other drawing figures.

Each of these modules in 152 may individually perform its intended functions or may function either alone or in conjunction with one or more other modules. For example, a physical implementation module 104 may work in conjunction with a spacetile manipulation module 106 and a track pattern manipulation module 102 to create a set of spacetiles, identify a set of spacetile tiles based at least in part upon the track patterns and/or some track requirements (e.g., on-track requirements for certain wires, etc.), identify a search probe, and then use the search probe to perform area-based search to identify or determine a viable routing solution for a particular segment of wire or a set of wires to be implemented in at least a part of an electronic designs.

A module or process described herein may be performed separately from one or more other modules or processes or may be performed simultaneously with one or more modules or processes. For example, the design rule checker 118 may individually, separately perform design rules checks or may reside in, for example, the physical design environment to monitor the implementation of an electronic design while the electronic design is being implemented using the physical design tools (e.g., global routing engine and/or a detail routing engine 114, a layout editor 116). In this example, the design rule checker 118 may further forward the generated results to various other tools (e.g., the physical design implementation tools described above) to guide the physical implementation of the electronic design.

Figure 2:
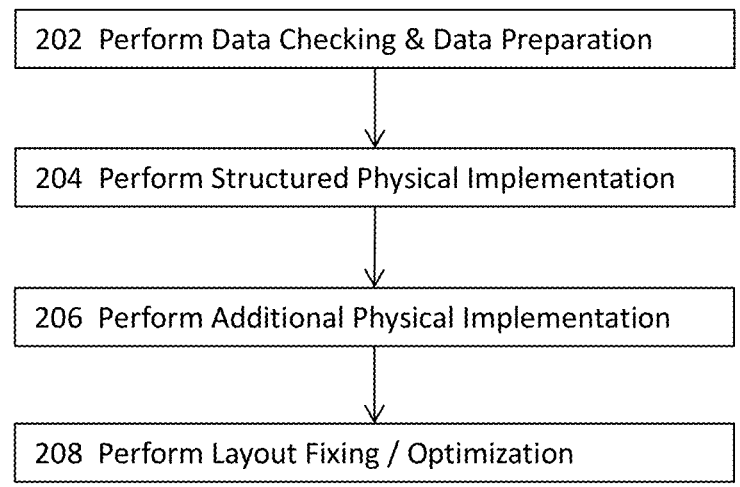
FIGS. 2-2D illustrate flow diagrams for implementing electronic designs using constraint driven techniques in some embodiments.
Figure 2A:
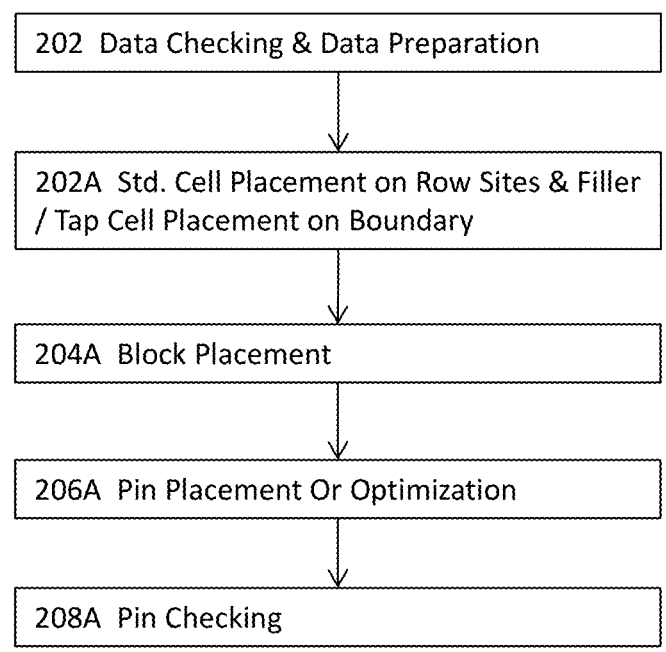
FIG. 2A illustrates an exemplary, more detailed flow diagram for a part of the flow diagram illustrated in FIG. 2A in some embodiments.
Figure 2B:
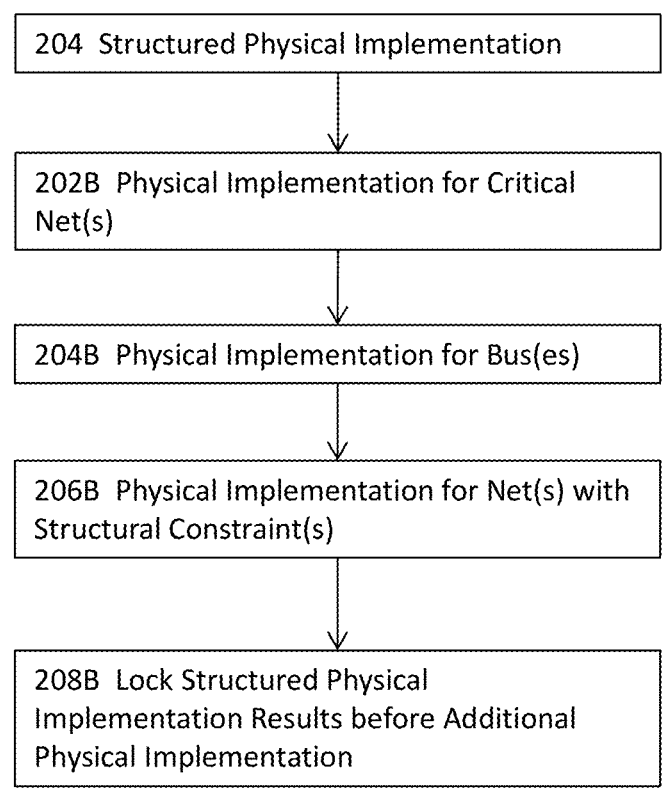
FIG. 2B illustrates an exemplary, more detailed flow diagram for a part of the flow diagram illustrated in FIG. 2A in some embodiments.
Figure 2C:
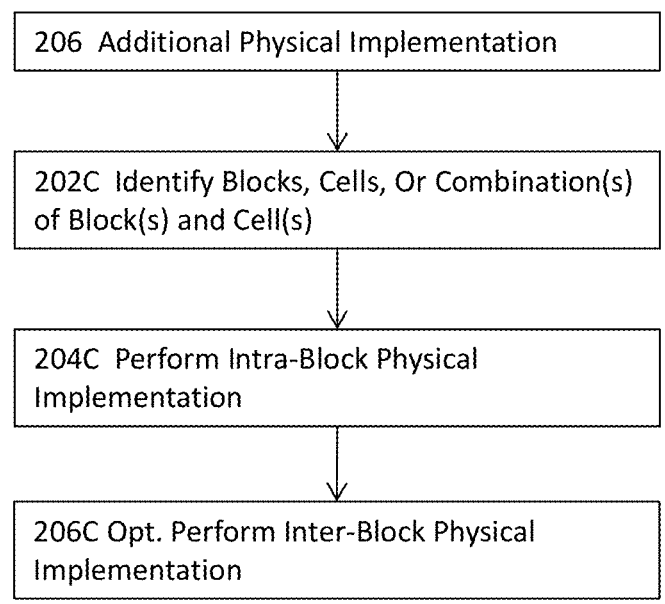
FIG. 2C illustrates an exemplary, more detailed flow diagram for a part of the flow diagram illustrated in FIG. 2A in some embodiments.
Figure 2D:
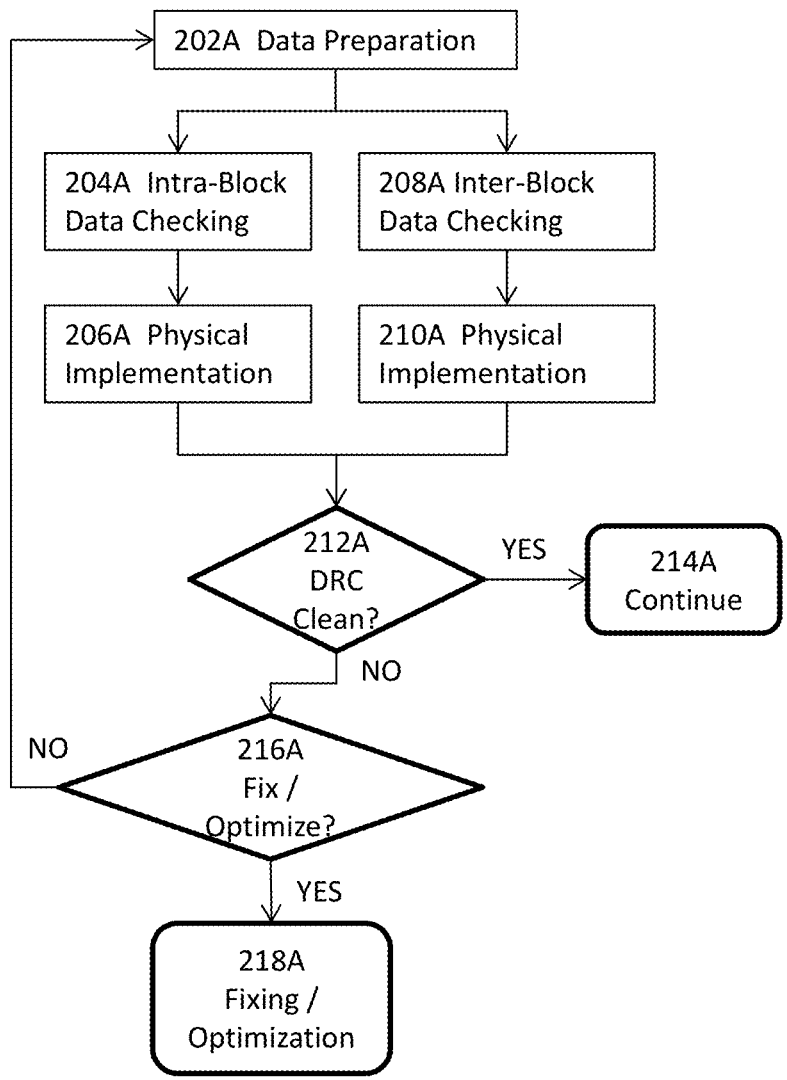

FIGS. 2-2D illustrate flow diagrams for implementing electronic designs using constraint driven techniques in some embodiments. More specifically, FIG. 2 illustrates a high-level flow diagram for implementing electronic designs using constraint driven techniques in these embodiments. The method or system may first begin with performing data checking and data preparation at 202. In some embodiments, the method or system performs the data checking and data preparation based at least in part upon a set of one or more design rules.

For example, the method or system may perform the data checking and data preparation process 202 while considering one or more design rules including, for example but not limited to, the double patterning odd cycle or odd loop rule(s), the forbidden edge pitch range rule(s), the minimum area rule, the minimum spacing rule(s), the cut-to-metal rule(s), other applicable rules, or any combinations thereof. With the results of data checking and data preparation, the method or system may use the resulting data to perform structured physical implementation at 202.

Moreover, the physical implementation results automatically satisfy the set of one or more design rules by using the results of the data checking and data preparation during the structured physical implementation with a first physical implementation strategy at 204 in some embodiments. In addition, the method or system may further optionally perform additional physical implementation at 206. For example, there may be one or more regions in a layer that cannot be implemented with the structured physical implementation and the first physical implementation strategy while automatically satisfying the set of one or more design rules. For these areas, the method or system may then perform this optional, additional physical implementation.

If the method or the system discovers any violations of design rules (e.g., the set of one or more design rules upon which the data check and data preparation 202 is based), the method or system may further perform layout fixing or optimization 208 to resolve at least some of the violations. In addition or in the alternative, the method or system may further perform a layout fixing or optimization 208 on the resulting layout generated by process or module 204 or 206. For example, a process or module aware of design rules (e.g., a design rule checking engine or a routing engine made aware of the design rules) may identify one or more violations of the design rules by checking the layout or a portion thereof against these design rules and optionally read the annotations associated with the one or more violations. The method and system may then perform one or both of the structured physical implementation (e.g., 204) and the additional physical implementation (e.g., 206) to fix the one or more violations or to further optimize the layout or the portion thereof.

In data checking and data preparation at 204, the data may include, for example but not limited to, any existing physical design data (e.g., geometries, shapes, etc.), any additional data (e.g., information or data about the manufacturing grids, routing tracks, etc.) that may be used to further the intended purposes or to aid the performance of various functions described herein, or any other data or information that may be used by various processes or modules described herein. It shall be noted that manufacturing grids are often provided by the manufacturers of integrated circuits and usually include imaginary grid lines in two orthogonal directions at a uniform pitch (e.g., a few angstroms).

These imaginary grid lines are not physical entities and have no thicknesses. Routing tracks include imaginary lines selected from these manufacturing grid lines for each routing layer and may include one or more pitches for each routing layer. A routing track may be used by a router to implement interconnects with a track-based routing strategy. Nonetheless, some routing methodologies described herein use a trackless routing strategy where the router does not reference any tracks in finding viable routing solutions. Some embodiments use a spacetile punch process to form one or more spacetiles to perform area-based search in finding viable solutions. It shall be noted that the search for viable routing solution is based on areas, which generally refer to area in a general sense and thus may include degenerated zero- or one-dimensional degenerated areas.

The data checking and data preparation process or module 202 may include placement of one or more standard or IP (intellectual property) cells to ensure these one or more cells are placed on row sites. The data preparation process or module 202 may further add one or more filler cells or tap cells near the boundary of the region of interest (e.g., a routing layer or a smaller portion of the routing layer) to provide enough space between top level pins on the boundary and metal shapes inside the standard cells to accommodate the via and the min area requirements of the pin layer. In addition or in the alternative, the data checking and data preparation process or module 202 may include placement of one or more blocks.

For example, a block may be placed in such a way to ensure that the pins of the block are aligned to the routing direction by, for example, rotating or orienting the block. The process or module 202 may also place or move a block to ensure that there is sufficient spacing or distance between the block and the top level pins to, for example, avoid min area violations for same layer block(s) and top level pins or to provide enough space to add via(s) on the top level or block pins. In some specific embodiments, process or module 202 may place some blocks to ensure that there is enough space for one or more routing channels such that the minimum width of a routing channel between the blocks is equal to the width required to accommodate interconnects along the channel direction plus the minimum length required to satisfy the minimum area design rule(s) of the pin layers which are perpendicular to the direction of the channel.

In addition or in the alternative, the data checking and data preparation process or module 202 may further include pin placement and optimization to ensure that pins are placed on proper edges according to the preferred or permitted routing direction on a routing layer. In some embodiments, both the right-way routing and wrong-way routing are permitted on a routing layer or a portion thereof. In these embodiments, an interconnect may include one or more L-bends or Z-bends. In some other embodiments, wrong-way routing may be prohibited on a routing layer or a portion thereof. In these latter embodiments, the only way for an straight interconnect to make a turn is to insert a via for the interconnect to jump to a neighboring layer to route in the other routing direction. For example, in a layer with horizontal routing direction, process or module 202 may ensure that pins are on either or both of the left and right edges of the region of interest. As another example, in a layer with vertical routing direction, process or module 202 may ensure that pins are on either or both of the top and bottom edges.

Furthermore, for intra-block pin placement and optimization, process or module 202 may further ensure that at least some pins (e.g., pins of instances of standard cells or IP cells) are aligned to routing tracks. One of the advantages of having at least some tracks aligned with the pins is to avoid unnecessary jogs (or via insertions). Another advantage is to avoid potential edge length violations or to reduce the need to reserve or budget additional escape area to accommodate off-track jogging for the access to certain pins. In addition or in the alternative, for inter-block pin placement and optimization in an hierarchical design, process or module 202 may further ensure the same order of pins for a set of nets connecting two blocks.

Figure 2E:
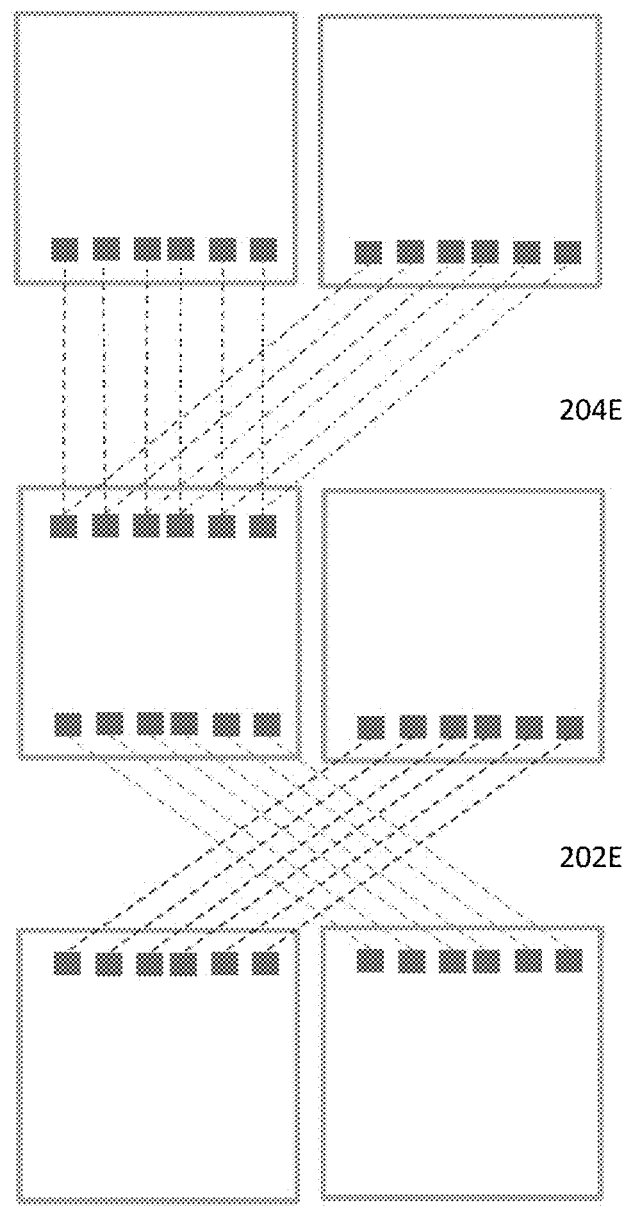
FIG. 2E illustrates an exemplary schematic illustration of bus routing in some embodiments.

In some embodiments, process or module 202 may identify the set of tracks having a pitch and aligned with the most number of pins of instances of blocks or cells in the region of interest. In addition or in the alternative, process or module 202 may reduce or minimize the number of connections that cross for multiple fanouts. An example is illustrated in FIG. 2E. One of the objectives of the data checking and data preparation at 202 is to identify a set of tracks that are aligned with most number of pins. In some embodiments, the set of tracks identified by the data checking and data preparation process or module 202 are identified to align with the most number of pins of instances on a routing layer or in a smaller region of the routing layer. In these embodiments, the routing layer or the smaller region of the routing layer may further include one or more I/O (input/output) pins Process or module 202 may perform pin escape, pin access, or pin alignment checking in some embodiments. For example, process or module 202 may perform pin escape check on one or more standard cell blocks to ensure that the standard cell pins may be escaped to higher metal layers by adding one or more vias by, for example, at least one of these pins intersects multiple tracks on a neighboring layer. In this example, a pin that fails the pin escape check may indicate that the net connecting the pin at issue may not be routed completed. Process or module 202 may also perform pin access check on block level designs to ensure that the router has access to the pins in these block level designs. In addition or in the alternative, process or module 202 may perform pin track alignment check to ensure that at least some of the top level pins (of one or more blocks or cells) are aligned with some routing tracks. It shall be noted that the use of the term "aligned" or "alignment" includes the scenarios where the centerline of a pin coincides with a routing track or the scenarios where the pin merely intersects a routing track.

During the structured physical implementation, the method or system may first physically implement circuit components that are more important or critical than others. For example, the method or system may first route the critical nets. In some embodiments, a critical net includes a net that is determined to be more important for timing or a net that requires or desires shielding to avoid, for example, cross coupling effects with one or more other nets. The method or system may also perform bus routing for one or more buses by creating one or more sets of nets to connect two or more blocks or cells during the structured physical implementation. The method or system may even use placement guidelines for pins, blocks, or cells to obtain better bus structures.

In addition or in the alternative, the method may also perform specialty physical implementation for one or more nets having structural constraints that may include, for example but not limited to, symmetry constraint(s), differential pair constraint(s) for creating balanced transmission systems to carry differential or equal and opposite signals, match net length constraint(s) for allowable differences in net lengths, etc. In some of the embodiments, the results of structured physical implementation may be locked and no longer subject to changes before further physical implementation (e.g., the additional physical implementation at 206) may be performed. In addition or in the alternative, the method or system may use various tools for the structured physical implementation at 204.

For example, the method or system may use an interactive wire editor for better or more structure controls, one or more scripts for better or more automation, or tools that provide physical implementation capabilities for implementing one or more specific or selected circuit components (e.g., nets or interconnects). In these embodiments, the electronic design resulting from the structured physical implementation at 202 automatically satisfies the first set of design rules, without performing any subsequent design rule checking for the first set of design rules. In other words, the implemented portion of the electronic design with the structured physical implementation is correct-by-construction with respect to at least the first set of design rules.

Due to variability of the designs, some other requirements, constraints, or design rules, or simply a design choice, there may exist one or more portions in a layer of an electronic design that is not or may not be physically implemented with the structured physical implementation described above. For example, a specific routing strategy or a user may opt for structured, on-track routing for specific portions of a layer in an electronic design but for other types of routing (e.g., trackless routing without using or referring to tracks in routing nets or interconnects).

Another example is an additional on-track rule for the structured physical implementation may create either one or more design rule violations with either the set of one or more design rules or one or more other design rules in a portion of a layer. In the latter example, the method or system may perform additional physical implementation for the portion. For example, the method or system may opt for a trackless routing strategy for the portion, rather than a track-based routing strategy used in the structured physical implementation stage. In some embodiments, the method or system may attempt to complete as much physical implementation as possible by using the tracked-based, structured physical implementation methodology (204) described herein and leave the additional physical implementation (206) as optional or for one or more portions that the structured physical implementation cannot create a DRC (design rule check) clean physical design.

The method or system may, for example, perform additional, intra-block physical implementation (e.g., routing) for standard cells or IP (intellectual property) cells. In performing the addition physical implementation, the method or system may avoid complex odd-cycle paths (or odd loops) in the electronic design. An odd-cycle path occurs when an odd number of polygons are arranged so that there are minimum spacing or spacing that is sufficiently close) to require the polygons to be on separately colored photomasks. The method or system may also perform the additional physical implementation to ensure that vias remain fully enclosed in pin metal or to avoid adjacent edge length violations.

In some embodiments, the method or system may further disable one or more same-mask color-based design rules during this additional physical implementation at 206. In addition or in the alternative, the method or system may optionally perform the additional physical implementation to create interconnections between two or more blocks or cells or to complete the remaining nets or interconnects that are not implemented during the structured physical implementation at 204.

FIG. 2A illustrates an exemplary, more detailed flow diagram for a part of the flow diagram illustrated in FIG. 2A in some embodiments. More specifically, FIG. 2A illustrates a more detailed flow diagram for the data checking and data preparation (202) of FIG. 2. During the data checking and data preparation, the process or module 202 may place or alter the placement of one or more standard cells, IP cells, or any combinations thereof at 202A to ensure that these cells or blocks are placed on row sites. In some embodiments where a block or cell is moved to a row site, process or module 202A may further add one or more filler cells or tap cells to meet such as dummy metal fill(s), for example, the metal density rule or requirements. The data checking and data preparation 202 may also place or modify the placement of one or more blocks at 204A to ensure that the one or more blocks are oriented in a way that their pins are aligned along the preferred or permitted routing direction.

In addition or in the alternative, the data checking and data preparation process or module may also place or modify the placement of a block at 204A to ensure that there is sufficient spacing between the block and its top level pins in order to comply with the minimum area design rule or to avoid violations thereof. Process or module 204A may further be performed on a block to ensure that there is sufficient spacing to accommodate one or more vias to access its top level pins. In addition or in the alternative, process or module 204A may also be performed to provide enough space for one or more routing channel such that the minimum width of a routing channel between the blocks is equal to the width required to accommodate interconnects along the channel direction plus the minimum length required to satisfy the minimum area design rule(s) of the pin layers which are perpendicular to the direction of the channel.

The data checking and data preparation process or module 202 may also perform pin placement or optimization at 206A to ensure that the pins are placed on the proper edges according to the preferred or permitted routing direction on a routing layer. For example, in a layer with horizontal routing direction, process or module 206A may ensure that pins are on either or both of the left and right edges of the region of interest. As another example, in a layer with vertical routing direction, process or module 206A may ensure that pins are on either or both of the top and bottom edges. The pin placement or optimization process or module 206A may further align one or more tracks with one or more pins (e.g., pins in an instance of a block or cell) within a block or a cell (e.g., IP cell or standard cell).

Aligning the tracks with corresponding pins may avoid unnecessary jogs or bends in the electronic design. Therefore, process or module 206A may identify a set of tracks having one or more pitches to align with the most number of instance pins such that the interconnects for the most number of pins may be implemented while satisfying the on-track design rule requiring an interconnect to be implemented on a track, or that the method or system need not budget more additional areas to accommodate off-track routing or jogs when accessing the top level pins of a block or cell. The process or module 206A may further perform inter-block pin optimization to ensure the same pin order for a set of nets interconnecting two or more blocks, cells, or combinations thereof or to reduce or even minimize the number of interconnects that cross other interconnect(s) for multiple fanouts.

The data checking or data preparation 202 may further perform checking on one or more pins for proper pin escape, access, or alignment at 208A. Process or module 208A is to ensure that the pins of cells or blocks may be escaped to an immediately neighboring routing layer by adding a via should a bend or jog is required or desired. Process or module 208A may further perform pin access check on the block-level or cell-level to ensure that the pin may be accessed by physical implementation tools to interconnect the pin with one or more other circuit components as specified in the electronic design. Process or module 208A may also check top level pins of a block or cell to ensure that at least some of the top level pins are aligned with tracks.

FIG. 2B illustrates an exemplary, more detailed flow diagram for a part of the flow diagram illustrated in FIG. 2A in some embodiments. More specifically, FIG. 2B illustrates more details about the structured physical implementation process or module 204. The process or module 204 may perform physical implementation for one or more nets that are more important or critical than others. For example, the process or module 204 may first physically implement one or more critical nets at 202B. In some embodiments, a critical net includes a net that is determined to be more important for timing or a net that requires or desires shielding to avoid, for example, cross coupling effects with one or more other nets.

Process or module 204 may perform physical implementation for one or more buses by, for example, creating one or more sets of nets to connect two or more blocks or cells at 204B during the structured physical implementation. Process or module 204B may even use placement guidelines for pins, blocks, or cells to obtain better bus structures. In addition or in the alternative, process or module 204 may perform one or more specialty physical implementations at 206B for one or more nets having structural constraints that may include, for example but not limited to, symmetry constraint(s), differential pair constraint(s) for creating balanced transmission systems to carry differential or equal and opposite signals, match net length constraint(s) for allowable differences in net lengths, etc.

In some embodiments, the results of structured physical implementation 204 may be locked at 208B and no longer subject to changes before further physical implementation (e.g., the additional physical implementation at 206) may be performed. In addition or in the alternative, the method or system may use various tools for the structured physical implementation at 204. For example, the method or system may use an interactive wire editor for better or more structure controls, one or more scripts for better or more automation, or tools that provide physical implementation capabilities for implementing one or more specific or selected circuit components (e.g., nets or interconnects).

FIG. 2C illustrates an exemplary, more detailed flow diagram for a part of the flow diagram illustrated in FIG. 2A in some embodiments. More specifically, FIG. 2C illustrates more details about the process or module 206 for performing additional physical implementation. Process or module 206 may identify one or more blocks, cells, or any combinations thereof at 202C and perform intra-block physical implementation for these one or more blocks, cells, or any combinations at 204C.

Process or module 204C may perform the additional, intra-block physical implementation (e.g., routing) for standard cells, IP (intellectual property) cells, blocks, or any combinations thereof. In performing the addition physical implementation, process or module 204C may avoid complex odd-cycle paths (or odd loops) in the electronic design. An odd-cycle path occurs when an odd number of polygons are arranged so that there are minimum spacing or spacing that is sufficiently close) to require the polygons to be on separately colored photomasks. The method or system may also perform the additional physical implementation to ensure that vias remain fully enclosed in pin metal or to avoid adjacent edge length violations. In some embodiments, process or module 204C may further disable one or more same-mask color-based design rules during this additional physical implementation at 204C.

Process or module 206 may optionally perform the additional physical implementation to create interconnections between two or more blocks or cells or to complete the remaining nets or interconnects that are not implemented during the structured physical implementation at 206C. In some embodiments, the method or system may perform the structured physical implementation to create interconnections between two or more blocks or cells or to complete the remaining nets or interconnects to the extent possible. In some of these embodiments, if the method or system completes the entire electronic design with the structured physical implementation methodology, process or module 206 may no longer be needed and is thus optional.

FIG. 2D illustrates a more detailed flow diagram for implementing electronic designs using constraint driven techniques in some embodiments. In FIG. 2D, the process flow begins with the data preparation 202A. The process flow may bifurcate into 204A for performing intra-block data checking and 208A for performing inter-block data checking in some of these embodiments. The process flow may proceed from 204A to 206A to perform physical intra-block implementation by using the data that has been checked at 204A. The process flow may further perform physical inter-block implementation at 208A for by using the data that has been checked at 204A. After the inter-block and intra-block physical implementation is complete, the process flow may determine whether the implementation results are DRC clean at 212A.

If the process flow determines that the implementation results are DRC clean at 212A, the process may proceed to 214A to continue with other electronic design processes. Otherwise, the process flow proceeds to 216A to determine whether or not there exist one or more design rule violations or whether or not further optimization may be performed in the physical implementation results. If the process or module 216A determines that there exist one or more design rule violations or further optimization may be achieved, the process flow may proceed to 218A to perform fixing or optimization on the physical implementation results. For example, process or module 218A may perform one or more fixes on an odd-cycled path, a forbidden edge pitch range violation, a via enclosure rule violation, etc. The details of each of the processes or modules illustrated in FIG. 2D have been provided in the preceding paragraphs with reference to FIGS. 2-2C.

FIG. 2E illustrates an exemplary schematic illustration of bus routing in some embodiments. More specifically, 202E illustrates exemplary cross routes between four blocks or cells, and 204E illustrates exemplary fan out routes in these illustrated embodiments.

Figure 3:
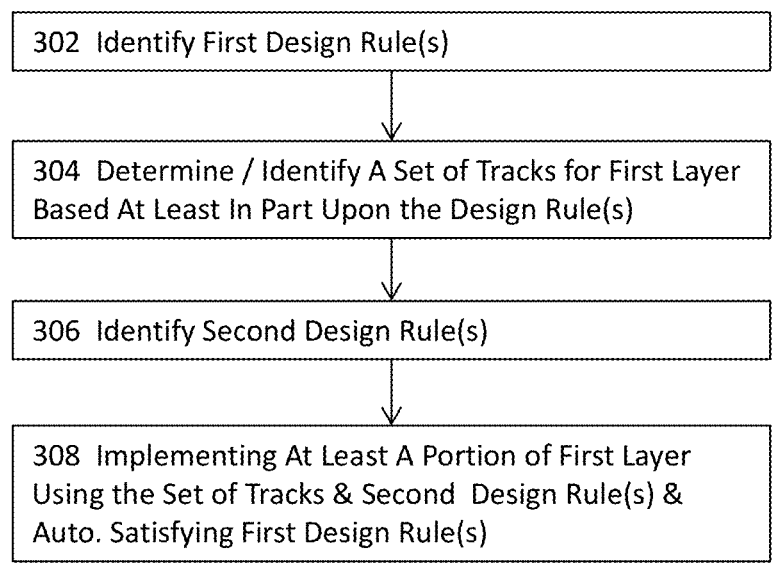
FIG. 3 illustrates a high-level flow diagram for implementing electronic designs using constraint driven techniques in some embodiments.

FIG. 3 illustrates a high-level flow diagram for implementing electronic designs using constraint driven techniques in some embodiments. The method or system may identify one or more first design rules at 302 and determine or identify a set of tracks for a first layer of an electronic design based at least in part upon the first one or more design rules at 304. The one or more design rules may include, for example but not limited to, the double patterning odd cycle or odd loop rule(s), the forbidden edge pitch range rule(s), the minimum area rule, the minimum spacing rule(s), the cut-to-metal rule(s), other applicable rules, or any combinations thereof. The set of tracks may have a single pitch (e.g., a uniform pitch) or multiple pitches (e.g., non-uniform pitches).

At 306, the method or the system may further identify one or more second design rules. In some of the illustrated embodiments, the one or more second design rules may include, for example but not limited to, an on-track design rule that requires an interconnect to be implemented along a track in at least a portion of the layer of the electronic design. The method or system may then implement at least a portion of the first layer at 308 using the set of tracks identified or determined at 304 and the one or more second design rules identified at 306. In these embodiments, the portion of the first layer implemented at 308 automatically satisfies the set one or more first design rules identified at 302, without performing any subsequent design rule checking for the first set of design rules. In other words, the implemented portion of the electronic design is correct-by-construction for at least the first set of design rules.

Figure 3A:
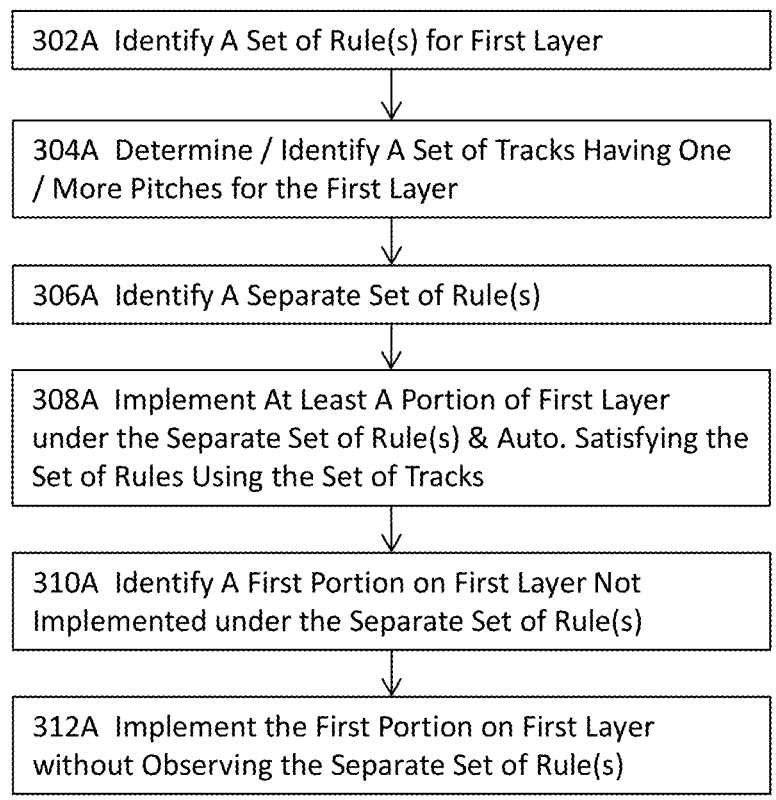
FIG. 3A illustrates a more detailed flow diagram for implementing electronic designs using constraint driven techniques in some embodiments.

FIG. 3A illustrates a more detailed flow diagram for implementing electronic designs using constraint driven techniques in some embodiments. More specifically, these embodiments illustrate that the method or system for implementing electronic designs using constraint driven techniques may identify a set of one or more design rules at 302A and determine or identify a set of tracks for a first layer of an electronic design based at least in part upon the first one or more design rules at 304A in substantially similar manners as those described for FIG. 3. The set of tracks may also have a single pitch (e.g., a uniform pitch) or multiple pitches (e.g., non-uniform pitches). At 306A, the method or the system may further identify a set of one or more separate design rules.

In some of the illustrated embodiments, the set of one or more separate design rules may include, for example but not limited to, an on-track design rule that requires an interconnect to be implemented along a track in at least a portion of the layer of the electronic design. The method or system may then implement at least a portion of the first layer at 308A using the set of tracks identified or determined at 304 and the set of one or more separate design rules identified at 306A. In these embodiments, the portion of the first layer implemented at 308A automatically satisfies the set of one or more design rules identified at 302A, without performing any subsequent design rule checking for the first set of design rules. In other words, the implemented portion of the electronic design is correct-by-construction for at least the first set of design rules.

The method or system may then identify a first portion on the first layer that has not been implemented under the set of one or more separate design rules. The first portion is not implemented for various reasons that may include, for example but not limited to, variability in the design or configuration of the first portion, some other requirements, constraints, or design rules, or simply a design choice. Therefore, there may exist zero or more portions in a layer of an electronic design that are not or may not be physically implemented with the separate set of rules identified at 306A.

For example, a user may opt for a trackless routing methodology for the first portion, rather than a track-based routing strategy as required by one of the separate design rules Another example where one of the separate design rules may include an on-track design rule but may create either one or more design rule violations with either the set of one or more design rules identified at 302A or one or more other design rules in the first portion of a layer. In the latter example, the method or system may thus identify the first portion at 310A. At 312A, the method or system may implement the identified first portion without observing the set of one or more separate rules. For example, the method or system may use a trackless routing methodology to implement the first portion at 312A.

Figure 3B:
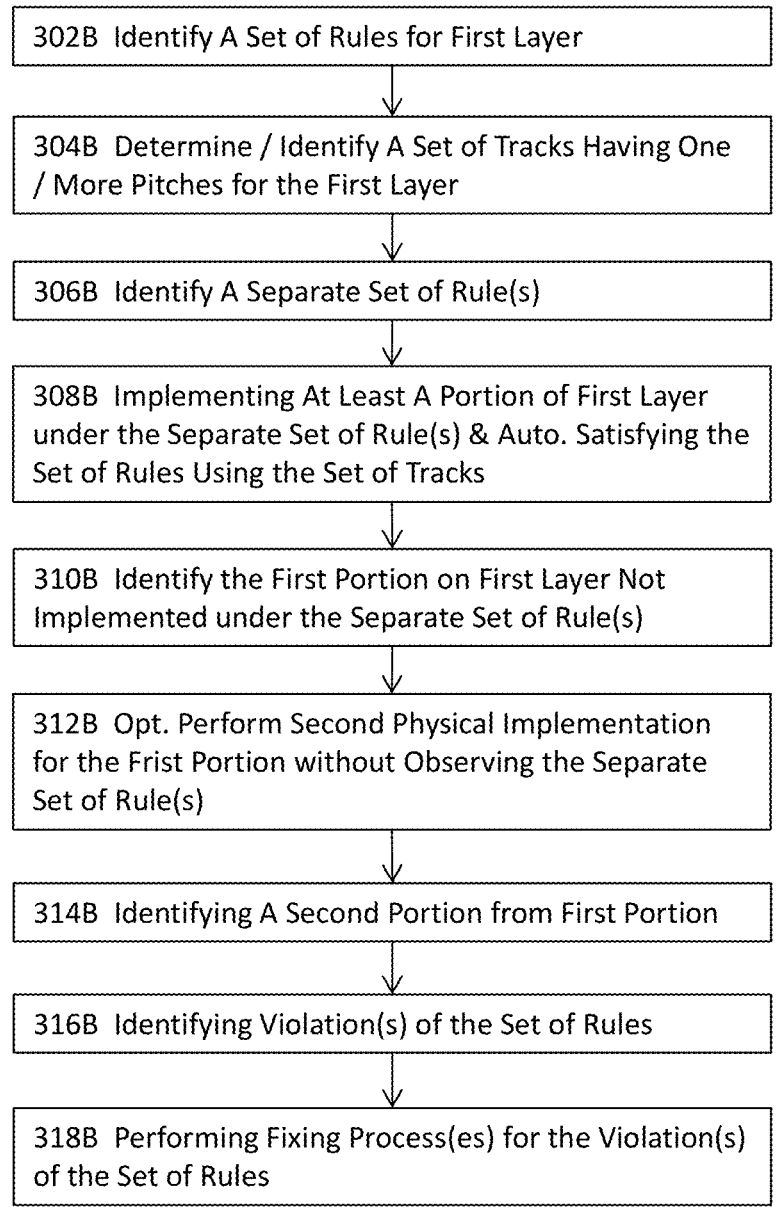
FIG. 3B illustrates a more detailed flow diagram for implementing electronic designs using constraint driven techniques in some embodiments.

FIG. 3B illustrates a more detailed flow diagram for implementing electronic designs using constraint driven techniques in some embodiments. In addition the performance of processes or modules 302B through 312B in substantially similar manners as those described for 302A through 312A of FIG. 3A, the method or system in these embodiments illustrated in FIG. 3B may further identify a second portion from the first portion at 314B and one or more violations of the set of design rules, which was identified at 302B, at 316B. In these embodiments, the method or system identifies one or more violations of the set of design rules from the implementation results of the second physical implementation at 316B.

This set of design rules identified at 302B is nonetheless automatically satisfied by the implementation results of 308B. One of the possible causes for having possible violations of the set of design rules by the second physical implementation is that the second physical implementation is carried out without observing the set of one or more separate design rules identified at 306B such as an on-track design rule. At 318B, the method or system may perform a fixing process on the one or more violations of the set of one or more design rules or one or more optimization processes on the first portion or one or more other portions on the first layer of the electronic design.

Figure 4A:
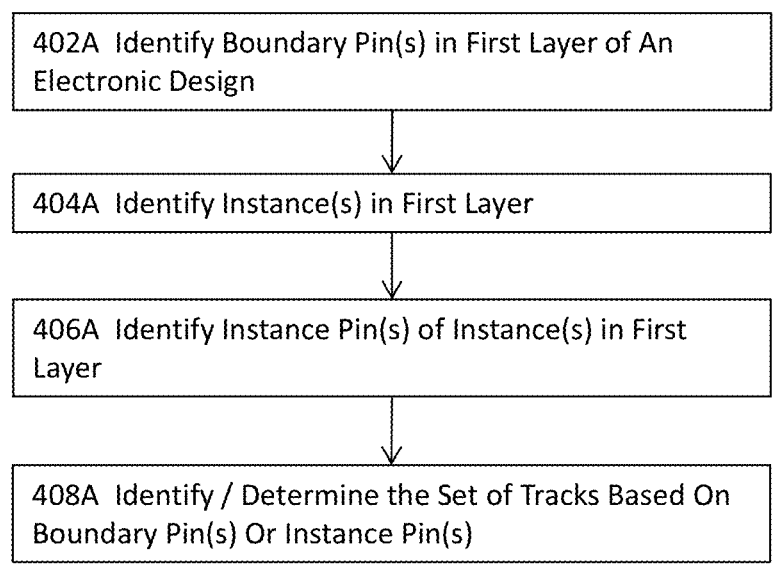
FIG. 4A illustrates a high-level flow diagram for identifying or determining a set of tracks for implementing electronic designs using constraint driven techniques in some embodiments.

FIG. 4A illustrates a high-level flow diagram for identifying or determining a set of tracks for implementing electronic designs using constraint driven techniques in some embodiments. The flow diagram illustrated in FIG. 4A may be a part of the data checking and data preparation process or module 202 in some embodiments. The method or system may begin with identifying one or more boundary pins in the first layer of an electronic design at 402A. A boundary pin may include an I/O (input/output) pin, a pad, a terminal, a power pin, pad, or terminal, etc. that is arranged along a boundary such as the boundary of standard cell, an IP cell, a block, or an instance thereof in some embodiments, or an imaginary boundary of an imaginary region in some other embodiments.

The method or system may further identify one or more instances on a first layer of an electronic design at 404A and one or more pins at 406A (collectively referred to as instance pins or an instance pin hereinafter) of each of at least one of the one or more instances identified at 404A. The method or system may then identify or determine a set of tracks at 408A based at least in part upon at least one of the one or more boundary pins, the one or more instance pins, or a combination thereof at 408A. For example, process or module 408A may identify, from the manufacturing grids provided by the manufacturers of integrated circuits, the set of tracks that align with or intersect the most number of boundary pins, the most number of instance pins, or the most number of the boundary pins plus the instance pins in some embodiments.

A track aligns with a pin if the track coincides with the centerline of the pin along the preferred or permitted routing direction. The set of tracks may have a uniform pitch in some embodiments or multiple, different pitches in some other embodiments. That is, the set of tracks may have uniform or non-uniform spacing values between two immediately neighboring tracks in different embodiments. In some embodiments, it may be difficult to identify a set of tracks to align with or intersect all of the pins of interest (e.g., all boundary pins, all instance pins, or all boundary pins and all instance pins). In these embodiments, process or module may optionally identify a manufacturing grid line, which usually has a much smaller spacing than tracks, and use the identified manufacturing grid line as a track.

Figure 4B:
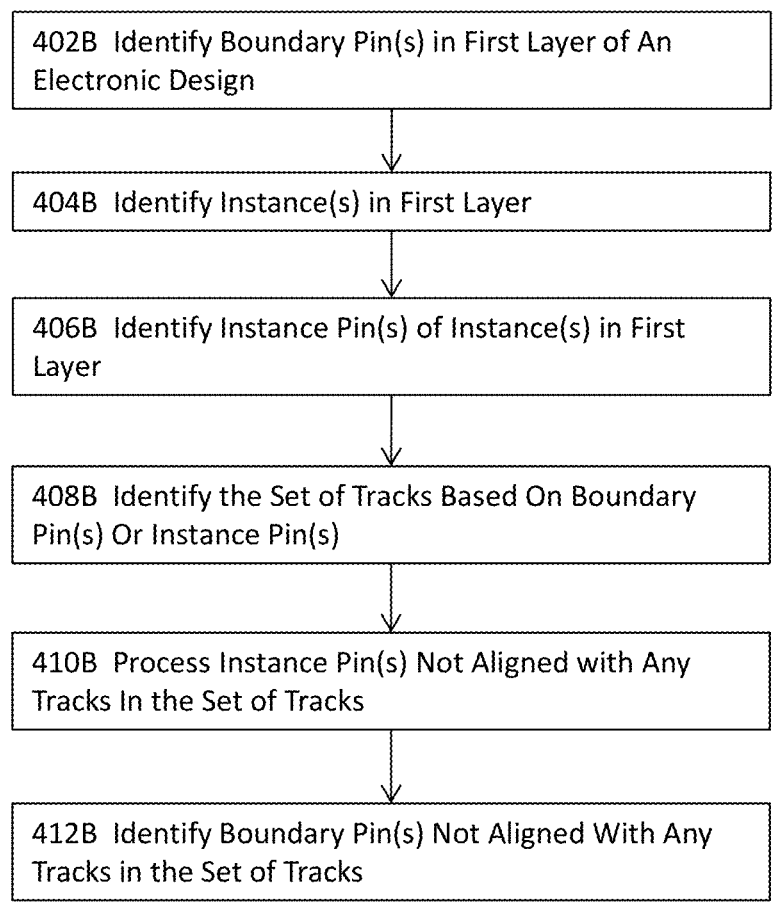
FIG. 4B illustrates a more detailed flow diagram for identifying or determining a set of tracks for implementing electronic designs using constraint driven techniques in some embodiments.

FIG. 4B illustrates a more detailed flow diagram for identifying or determining a set of tracks for implementing electronic designs using constraint driven techniques in some embodiments. In addition to the performance of processes or modules 402B through 408B in substantially similar manners as those described for 402A through 408A of FIG. 4A, the method or system in these embodiments illustrated in FIG. 4B may further process at least one of the instance pins that is not aligned with or does not intersect with any tracks in the set of tracks identified at 408B.

For example, the method or system may flag the instance pin that is not aligned with any tracks in some embodiments, move the instance pin if the design allows, or simply add the instance pin to a list of circuit components to be further implemented by additional physical implementation (e.g., the additional physical implementation 206 of FIG. 2). The method or system may also identify at least one of the boundary pins that is not aligned with or does not intersect with any tracks in the set of tracks identified at 408B.

Figure 4C:
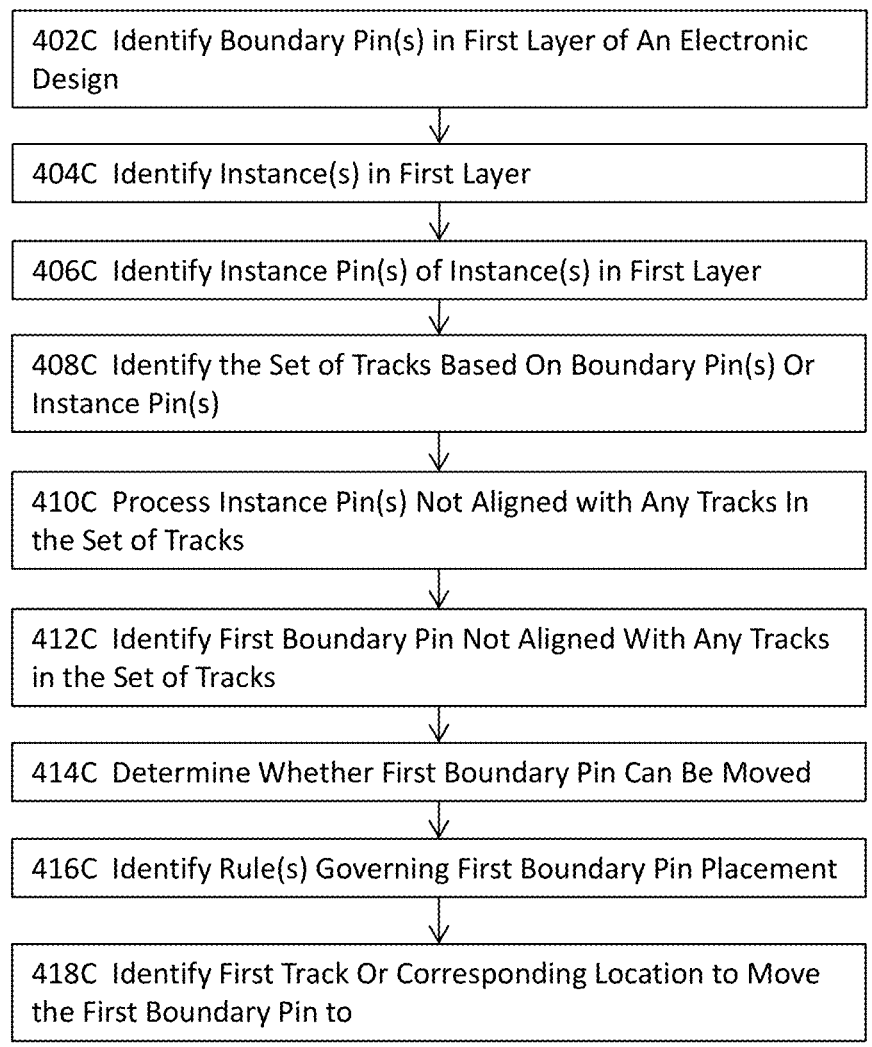
FIG. 4C illustrates a more detailed flow diagram for identifying or determining a set of tracks based on characteristics of some pins for implementing electronic designs using constraint driven techniques in some embodiments.

FIG. 4C illustrates a more detailed flow diagram for identifying or determining a set of tracks based on characteristics of some pins for implementing electronic designs using constraint driven techniques in some embodiments. In addition to the performance of processes or modules 402C through 408C in identical or substantially similar manners as those described for 402A through 408A of FIG. 4A and for 402B through 410B of FIG. 4B, the method or system in these embodiments illustrated in FIG. 4C may further identify, at 412C, a first boundary pin that does not align with or intersect any tracks of the set of tracks identified at 408C and determine whether or not the first boundary pin may be moved to another location.

In some embodiments where the first boundary pin is determined to be able to move to another location, the method or system may further identify one or more design rules that may govern where the first boundary pin may be moved at 416C. The method or system may identify a track to align with or intersect the first boundary pin. In some embodiments, the method or system may identify the first track at 418C to align with or intersect the first boundary pin based at least in part upon the one or more design rules identified at 416C. In these embodiments illustrated in FIG. 4C, the method or system determines that the space, one or more design rules, or both permit moving the original first boundary pin to align with a track so as to implement the physical design while observing the on-track design rule. The method or system thus directly moves the first boundary pin to a new location along the original boundary.

Figure 4D:
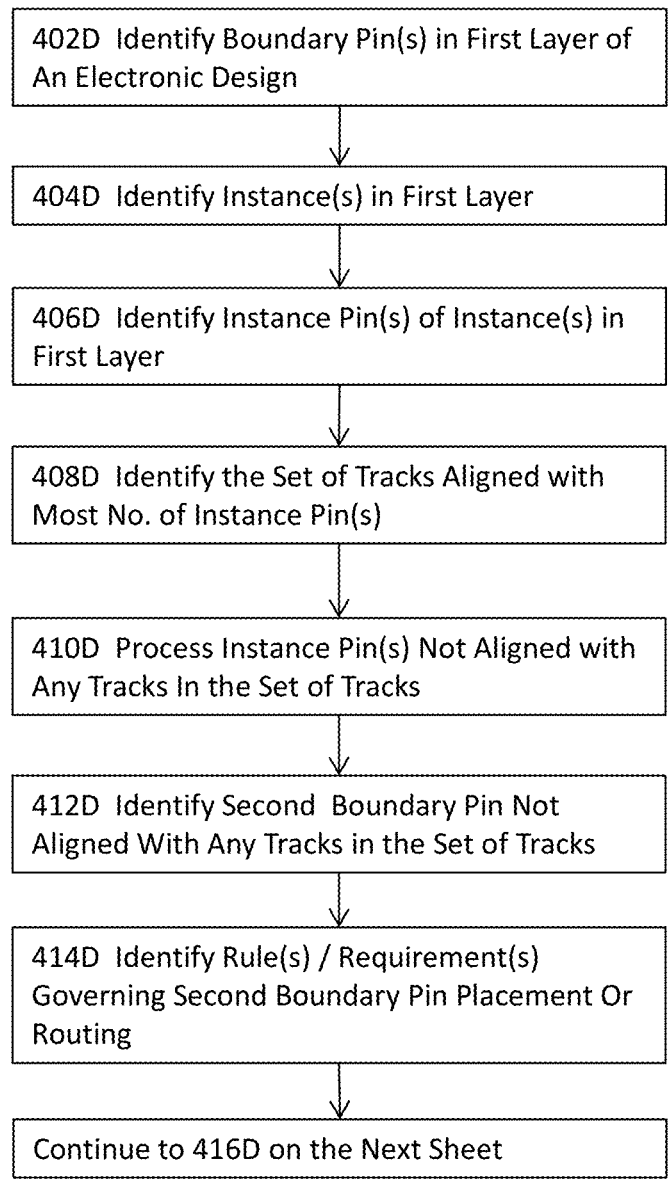
FIG. 4D illustrates another more detailed flow diagram for identifying or determining a set of tracks based on characteristics of some pins for implementing electronic designs using constraint driven techniques in some embodiments.
Figure 4D:
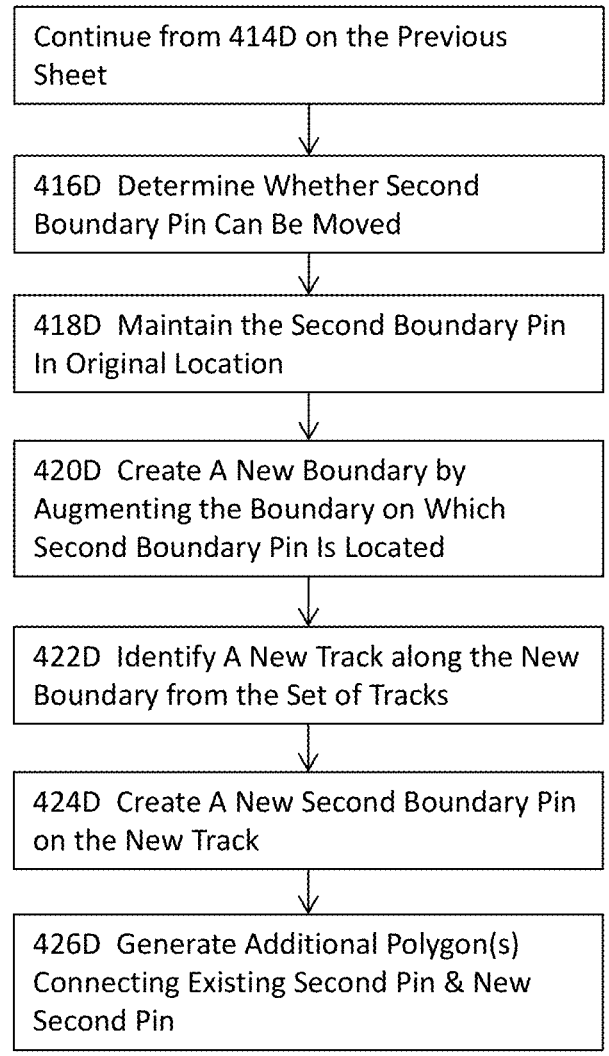

FIG. 4D illustrates another more detailed flow diagram for identifying or determining a set of tracks based on characteristics of some pins for implementing electronic designs using constraint driven techniques in some embodiments. In addition to the performance of processes or modules 402D through 414D in identical or substantially similar manners as those described for 402A through 408A of FIG. 4A, for 402B through 410B of FIG. 4B, and for 402C through 416C of FIG. 4C, the method or system in these embodiments illustrated in FIG. 4D may further determine whether the second boundary pin may be moved.

In some embodiments where it is determined that the second boundary pin may not be moved at 416D, the method or system may then maintain the second boundary pin in its original location at 418D and create a new boundary by, for example augmenting or offsetting at least a part of the original boundary element on which the second boundary pin is located or creating a new boundary to create additional space sufficient to accommodate at least a new pin. The amount of spacing between the original boundary and the newly created or augmented boundary may be determined based at least in part upon one or more design rules (e.g., a minimum spacing rule for a layer, a via cut size rule, a via enclosure rule, etc.) or may be specified by a user. In some situations where the user does not specify s spacing value, a default spacing value may be applied to ensure compliance with at least the applicable design rules. The additional space may even be created to accommodate the interconnect with or without one or more bends or to accommodate one or more vias to connect the second boundary pin and a newly created boundary pin. The method or system may then identify a track along the new boundary of the created, additional space from the set of tracks at 422D and create a new second boundary pin aligned with or intersecting the new track at 424D.

The method may then connect the original second boundary pin and the newly created second boundary pin by creating one or more additional polygons, interconnects, or vias at 426D. As soon as the newly created second boundary pin and the one or more interconnecting polygons, interconnects, or vias are created, the method or system may then refer to the newly created second boundary pin, instead of the original second boundary pin, to implement the remaining portion of the layer. In these embodiments illustrated in FIG. 4D, the second boundary pin cannot be moved and is not aligned with or intersect any tracks in the set of tracks identified at 408D.

The method or system identifies a track from the track. Nonetheless, the location along the original boundary and the identified track or other tracks within a predetermined range along the original boundary may not be able to accommodate a new boundary pin due to, for example, insufficient space or one or more design rules prohibiting a new pin in the new location. In addition, the method or system determines that the original boundary may be augmented or offset to create additional space that accommodates a new second boundary pin. The method or system may then augment or offset at least a part of the original boundary along which the original second boundary pin is located to create this additional space and identify a new location along this newly created boundary to create a new pin while maintaining the original second boundary pin in its original location.

The method or system then creates one or more additional polygons, interconnects, or vias to connect the original second boundary pin and the newly created second boundary pin. The method or system then refers to this newly created second boundary pin when performing physical implementation for the layer involving the original second boundary pin.

Figure 4E:
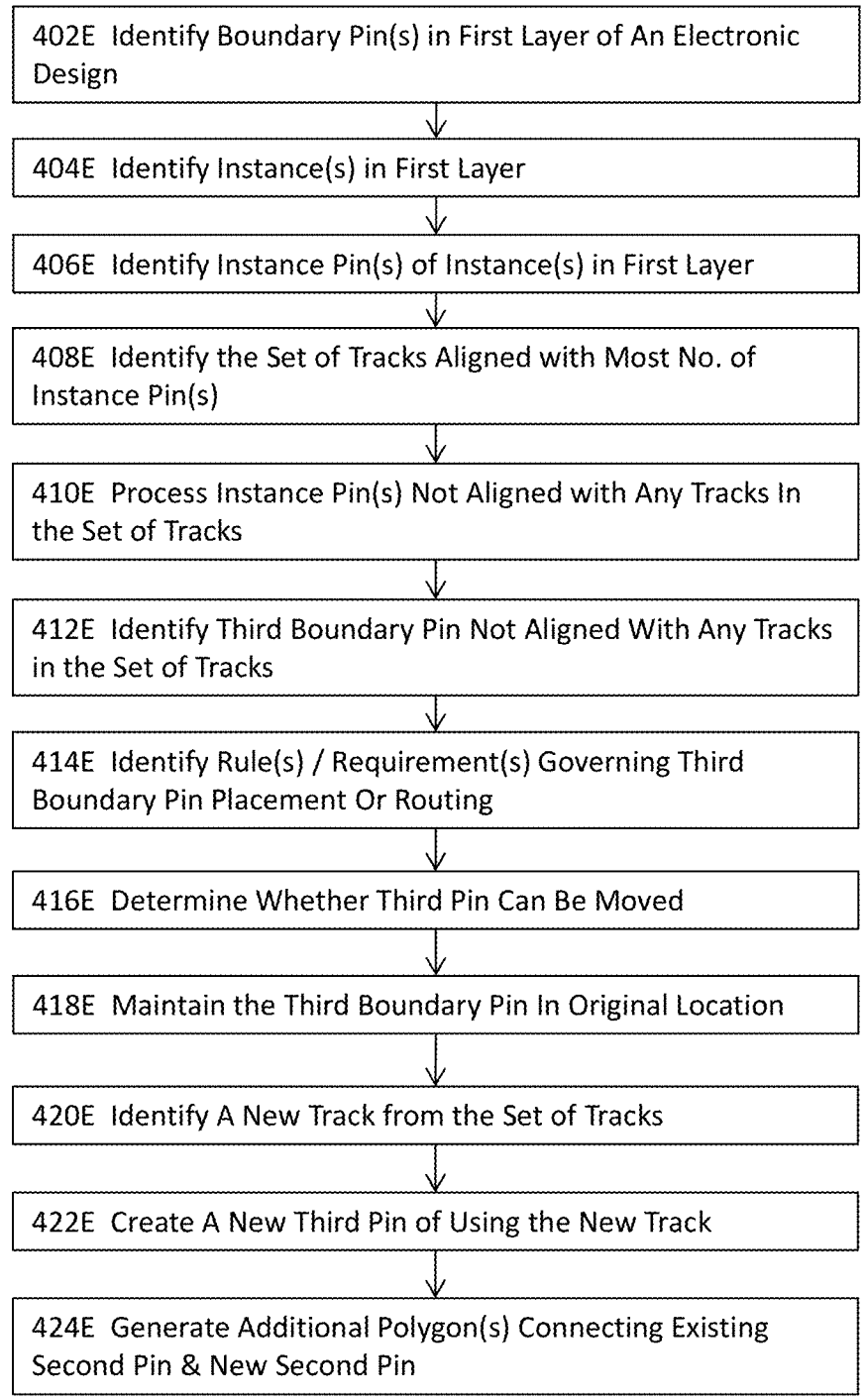
FIG. 4E illustrates another more detailed flow diagram for identifying or determining a set of tracks based on characteristics of some pins for implementing electronic designs using constraint driven techniques in some embodiments.

FIG. 4E illustrates another more detailed flow diagram for identifying or determining a set of tracks based on characteristics of some pins for implementing electronic designs using constraint driven techniques in some embodiments. In addition to the performance of processes or modules 402E through 416E in identical or substantially similar manners as those described for 402D through 416D of FIG. 4D, the method or system in these embodiments illustrated in FIG. 4E may maintain the third boundary pin in its original location at 418E and identify a new track from the set of tracks at 420E. The method or system may then create a new third boundary pin to align with the new track at 422E.

The method may then connect the original third boundary pin and the newly created third boundary pin by creating one or more additional polygons, interconnects, or vias at 424E. As soon as the newly created third boundary pin and the one or more interconnecting polygons, interconnects, or vias are created, the method or system may then refer to the newly created third boundary pin, instead of the original third boundary pin, to implement the remaining portion of the layer. In these embodiments illustrated in FIG. 4E, the third boundary pin cannot be moved and is not aligned with or intersect any tracks in the set of tracks identified at 408E.

The method or system identify a track from the track, and create a new third boundary pin in a new location while maintaining the original third boundary pin in its original location. The method or system then creates one or more additional polygons, interconnects, or vias to connect the original third boundary pin and the newly created third boundary pin. The method or system then refers to this newly created second boundary pin when performing physical implementation for the layer involving the original second boundary pin.

Figure 4F:
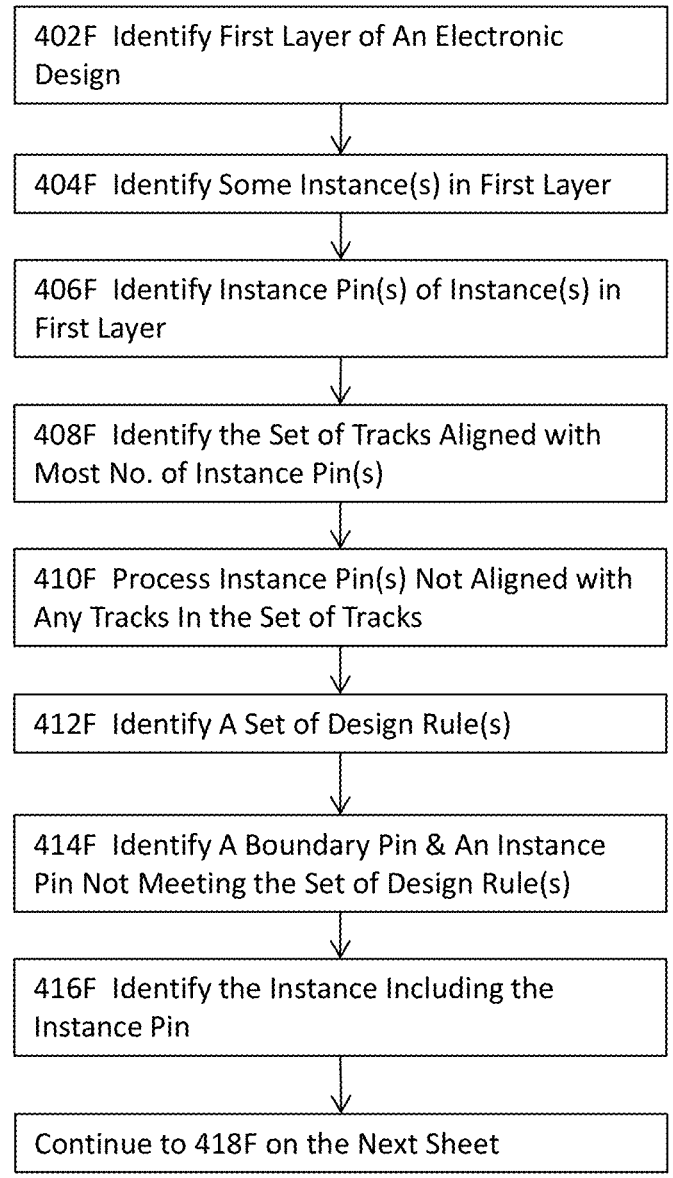
FIG. 4F illustrates a more detailed flow diagram for identifying or determining a set of tracks based on one or more additional design rules for implementing electronic designs using constraint driven techniques in some embodiments.
Figure 4F:
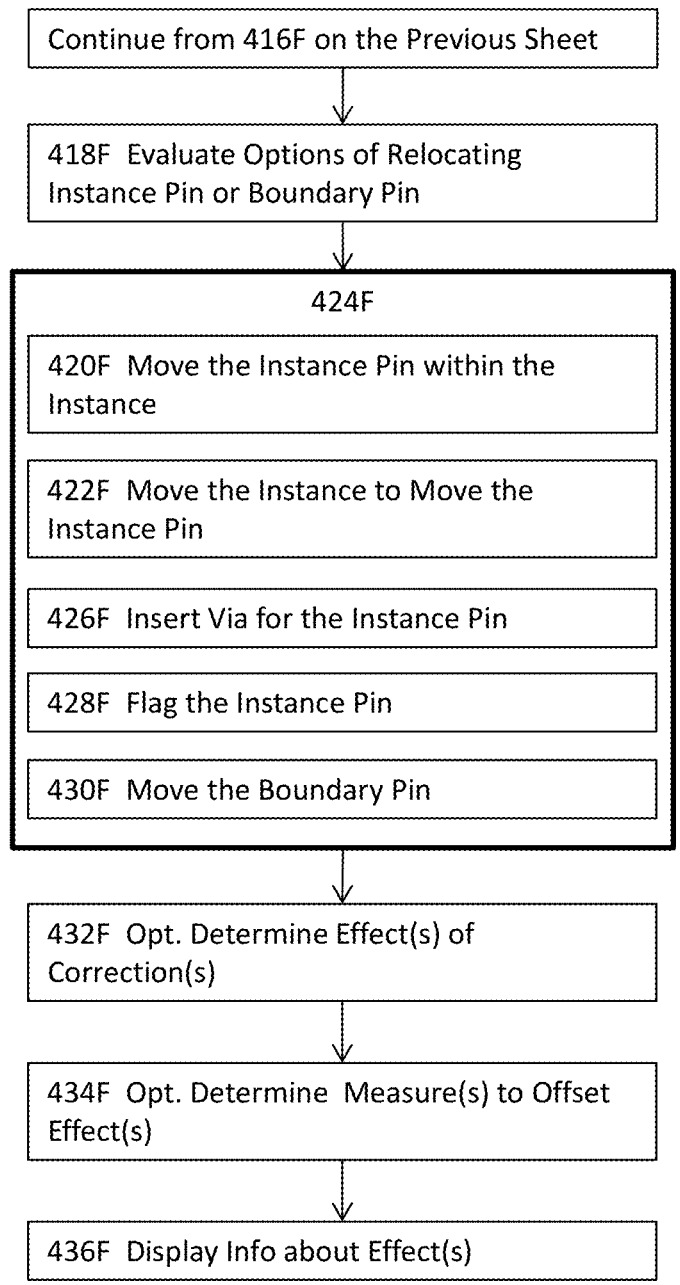

FIG. 4F illustrates a more detailed flow diagram for identifying or determining a set of tracks based on one or more additional design rules for implementing electronic designs using constraint driven techniques in some embodiments. More specifically, these embodiments illustrated in FIG. 4F describe certain scenarios when an instance pin is not aligned with or does not intersect any tracks identified or determined for implementing the portion of an electronic design including the instance pin. The method or system may identify a first layer or a portion (collectively a region of interest) thereof to be implemented at 402F and one or more instance pins in the region of interest at 404F.

As described previously, the method or system may identify one or more instance pins of one or more instances in the region of interest at 406F and a set of tracks at 408F based at least in part upon the one or more identified instance pins. At 410, the method or system may process the one or more identified instance pins that are not aligned with or do not intersect any tracks in the set of tracks identified or determined at 408F. Once the one or more instance pins are identified, the method may identify a set of one or more design rules at 412F. The set of one or more design rules may include, for example but not limited to, a minimum area rule that controls the minimum area or length of an interconnect segment connecting an instance pin and a boundary pin.

The method or system may then identify an instance pin and its corresponding boundary pin that may not meeting the set of one or more design rules at 414F and the instance including the identified instance pin at 416F. Before performing further processes to address the issues caused by the instance pin and the boundary pin, the method or system may evaluate options of relocating the instance pin or the boundary pin at 418F. In some embodiments, the method or system performs such evaluations by using a costing mechanism that considers one or more factors including the performance characteristics of the physical implementation tools, the performance characteristics of the electronic circuit, time needed for implementing an option or other cost factors of each option, etc. The method or system may then perform one or more of processes 424F to clear the set of one or more design rules. The one or more processes 424F may include, for example but not limited to, processes 420F, 422F, 426F, 428F, and 430F.

For example, the one or more processes 424F may the process 420F of moving the instance pin within the instance, the process 422F of moving the instance including the instance pin, or the process 430F of moving the boundary pin to clear set of one or more design rules identified at 412F. In addition or in the alternative, the one or more processes 424F may include the process 426F of inserting a via for implementing the instance pin or the process 428F of flagging the instance pin by using, for example, a design rule checker or another physical implementation tool. Once the method or system performs the selected one or more corrective processes from 420F to 430F, the method or system may further optionally determine the effects of the one or more corrective processes at 432F and one or more measures to offset the effects at 434F. For example, the method or system may determine the change in metal density with respect to a metal density rule after moving an instance pin, an instance including the instance pin, or the boundary pin at 432F and a corresponding fix such as insertion of metal fill patterns at 434F to offset or correct the change in metal density due to the move. The method or system may further optionally display the effects or the one or more corresponding measures for the effects on a display apparatus.

Figure 5A:
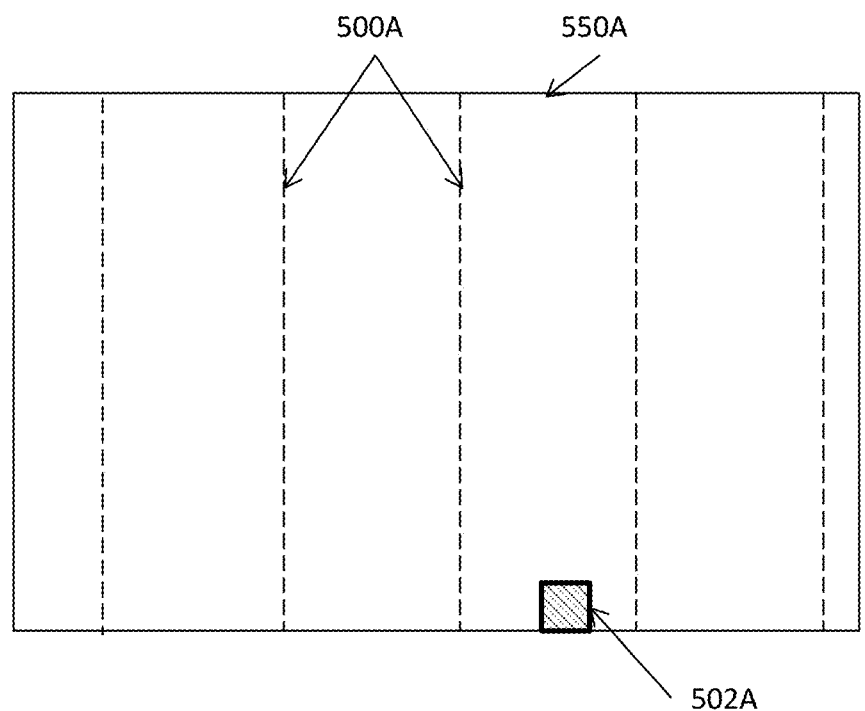
FIG. 5A illustrates a portion an exemplary layout including a pin in some embodiments.
Figure 5B:
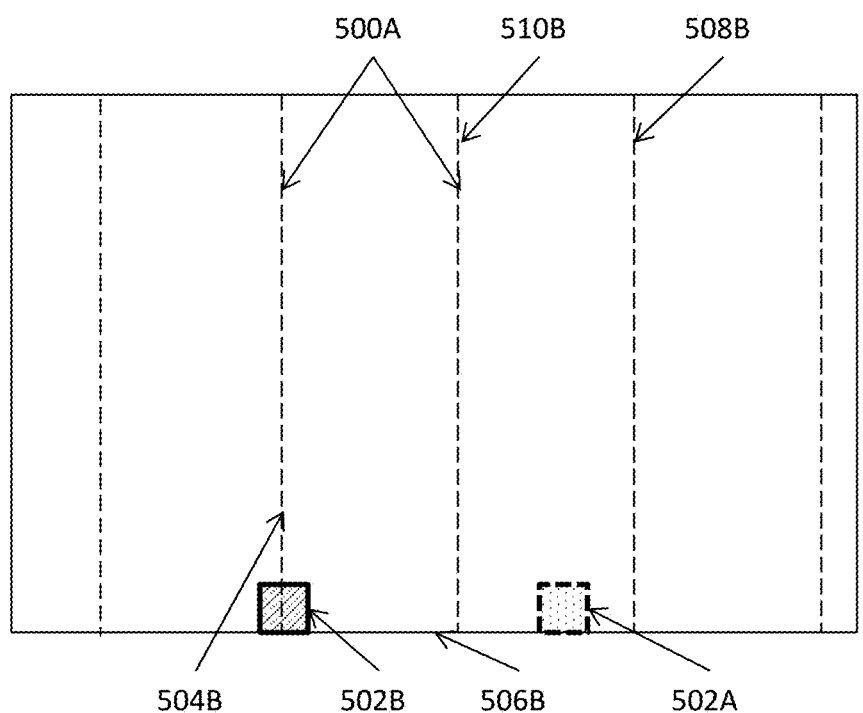
FIG. 5B illustrates an exemplary approach for checking or preparing data of the exemplary layout based on one or more characteristics of the pin illustrated in FIG. 5A in some embodiments.
Figure 5C:
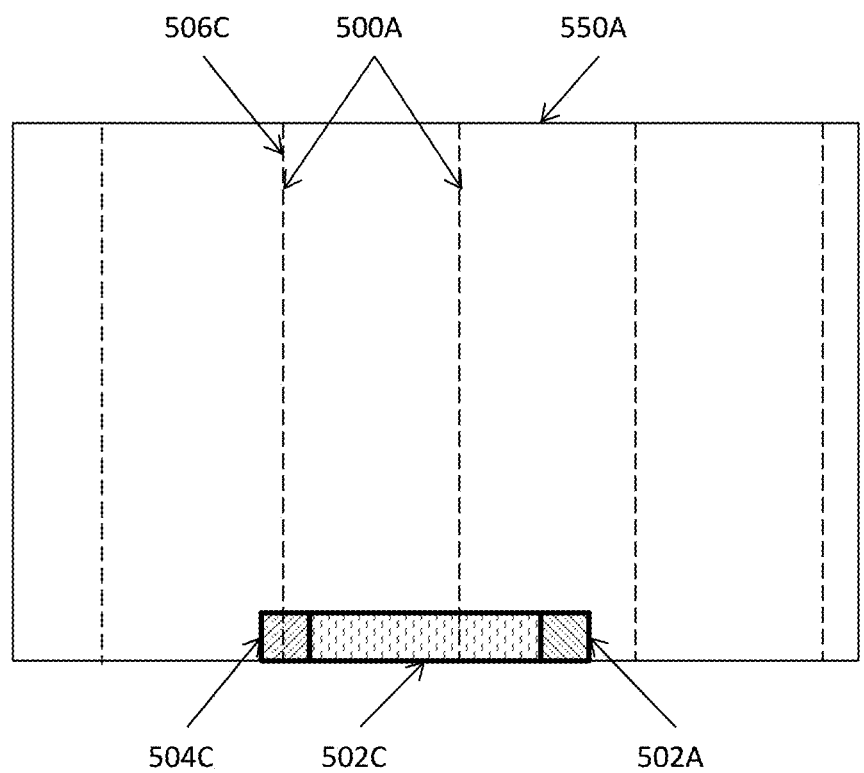
FIG. 5C illustrates another exemplary approach for checking or preparing data of the exemplary layout based on one or more characteristics of a pin illustrated in FIG. 5A in some embodiments.
Figure 5D:
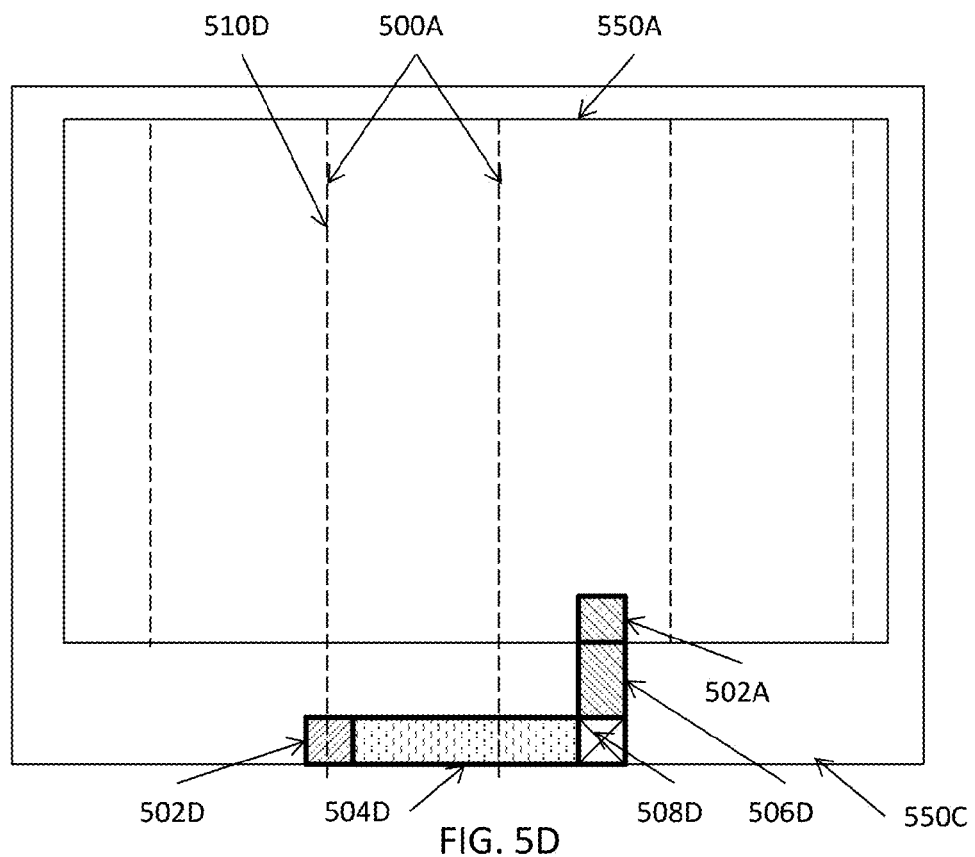
FIG. 5D illustrates an exemplary approach for checking or preparing data of the exemplary layout based on one or more characteristics of a pin illustrated in FIG. 5A in some embodiments.

FIG. 5A illustrates a portion an exemplary layout including a pin in some embodiments. The portion 550A of the exemplary layout includes a boundary pin 502A. The boundary pin 502A is situated along the bottom boundary of the portion but is not aligned with and does not intersect any of the tracks 500A in the portion. In some embodiments where an on-track design rule governs the physical implementation of the portion, the physical implementation tools (e.g., one or more routing engines 114 of FIG. 1) cannot access the boundary pin 502A via any tracks to satisfy the boundary pin 502A. FIGS. 5B-D illustrate some fixes according to some embodiments described herein with reference to FIGS. 4C-E in some embodiments. In some other embodiments, the method or system described herein may opt for a trackless implementation methodology to access and implement the portion of the exemplary design including the boundary pin 502A.

FIG. 5B illustrates an exemplary approach for checking or preparing data of the exemplary layout based on one or more characteristics of the pin illustrated in FIG. 5A in some embodiments. In this example, the method or system may use the methodology illustrated in FIG. 4C to identify a track 504B form the set of tracks 500A after examining one or more design rules governing the physical implementation (e.g., placement or routing) of the boundary pin 502A. A new location 502B may then be created along the original boundary 506B. The method or system may then create a new boundary pin 502B at this new location. This new boundary pin 502B is thus aligned with the track 504B, and the physical implementation for this new boundary pin 502B may then satisfy the on-track design rule. In some embodiments, the new boundary pin 502B is created such that the centerline of the new boundary pin 502B is aligned with the identified track 504B. During physical implementation for the original boundary pin 502A, the method or system now refers to the new boundary pin 502B, instead of the original boundary pin 502A.

It shall be noted that although FIG. 5B illustrates the selection of track 504B for the new boundary pin 502B, while skipping the closer tracks 508B and 510B, the determination of a track may be subject to one or more design rules, requirements, preferences, or constraints. For example, the method or system may select track 508B if the closest possible track is to be selected, and there is no other limitation preventing track 508B from being selected for the boundary pin 502A. Similarly, track 510B, which is determined to be the next closest track, may be selected if the closest possible track is to be selected, and there is some limitation preventing track 508B from being selected for the boundary pin 502A. The method or system may also select any other available track as long as the selection of the track for the boundary pin 502A satisfies the governing rule(s), requirement(s), preference(s), or constraint(s). Therefore, the identification and selection of track 504B illustrated in FIG. 5B (and also in FIGS. 5C-D) is not intended to and thus shall not be interpreted as limiting the scope of other embodiments or the scope of the claims, unless otherwise specifically recited or claimed.

FIG. 5C illustrates another exemplary approach for checking or preparing data of the exemplary layout based on one or more characteristics of a pin illustrated in FIG. 5A in some embodiments. In this example, the original boundary pin 502A cannot be moved to another location. The method or system may first determine that the original boundary 550A has sufficient space to accommodate the creation of a new boundary pin and proceed to identify a new track 504C from the set of tracks 500A. A new location may thus be identified or created along the original boundary 550A for the method or system to create a new boundary pin 504C.

Unlike the example illustrated in FIG. 5B, the original boundary pin 502A is not moved to the new location. Rather, a new boundary pin 504C is created at this new location and coexists in the portion with the original boundary pin 502A. The method or system may then create an additional polygon or interconnect 502C to connect the original boundary pin 502A and the new boundary pin 504C. During physical implementation for the original boundary pin 502A, the method or system now refers to the new boundary pin 504C which is electrically connected to the original boundary pin 502A. Therefore, interconnections routed for the new boundary pin 504C may achieve identical or substantially similar results as interconnections routed for the original boundary pin 502A.

FIG. 5D illustrates an exemplary approach for checking or preparing data of the exemplary layout based on one or more characteristics of a pin illustrated in FIG. 5A in some embodiments. In this example, the original boundary pin 502A cannot be moved to another location, and it is determined that the original boundary does not include sufficient space to accommodate a new boundary pin for the original boundary pin. In addition, it is determined that the original boundary on which the original boundary pin 502A is located may be augmented or offset to create a new boundary pin and its associated interconnections to the original boundary pin 502A. In some embodiments, the original boundary of the block or a portion thereof may be offset to obtain a modified, original boundary while maintaining the original hierarchical structure of the electronic design. The method or system may first identify a track 510D from the set of tracks 500A and augment or offset at least a portion of the boundary 550C on which the original boundary pin is located by a sufficient distance. The sufficient distance may be determined by the geometric characteristics of the new boundary pin, the required interconnections to the original boundary pin 502A, one or more design rules, or any combinations thereof in some embodiments. The one or more design rules may include the minimum area rule(s), the spacing rule(s), the multiple exposure rule(s), one or more rules governing the vias (e.g., via cut size rule, via enclosure rule, etc.), one or more rules governing whether wrong-way routing is permitted, etc.

The method or system may then create a new boundary pin 502D at the new location based on this augmented or offset boundary and the identified track 510D. The method or system may further furnish the interconnections 504D and 506D to connect the original boundary pin 502A to the new boundary pin 502D. In some embodiments where wrong-way routing is permitted in this portion of the electronic design, the interconnection between the two boundary pins may be implemented as a simple L-bend. In some other embodiments where wrong-way routing is prohibited such that no horizontal (in FIG. 5D) interconnects are permitted, the method or system may drop a via at 508D and 502D to jump to an immediately neighboring layer to finish the interconnection between the original boundary pin 502A and the new boundary pin 502D. It shall be noted that in augmenting or offsetting the boundary to form the new boundary 550C, the method or system may or may not augment or offset the entire boundary of the region of interest. Rather, the method or system may offset only one side or even a portion of a side of the original boundary to achieve the intended purposes. It shall also be noted that routing along the boundary of a block or cell may or may not be allowed. In some embodiments where routing along the boundary of a block or cell is prohibited to, for example, avoid short circuit when a block or cell is abutted against another block or cell, the method or system may opt for the approach illustrated in FIG. 5I.

Figure 5E:
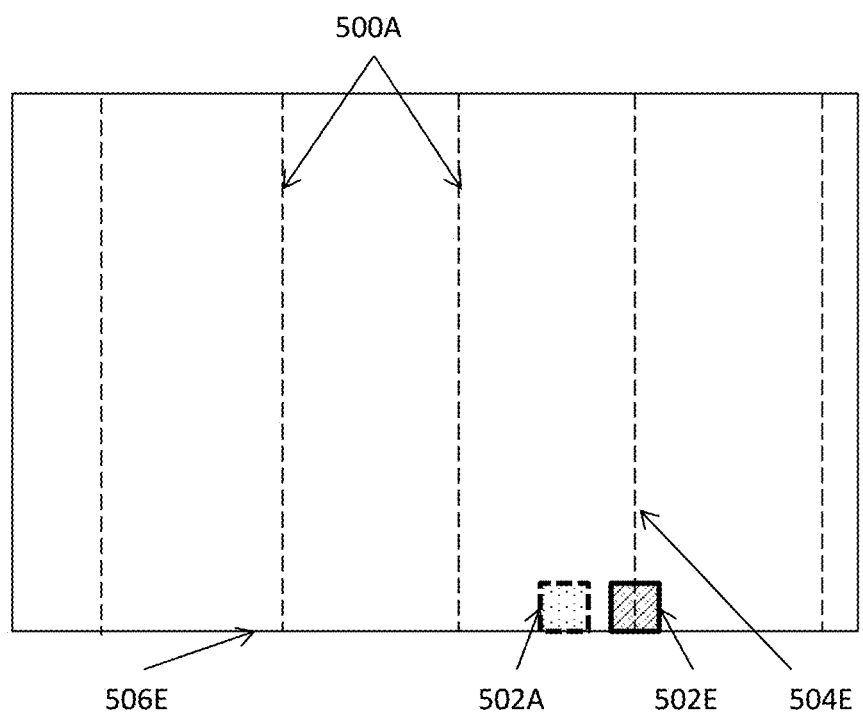
FIG. 5E illustrates another approach for checking or preparing data of a layout based on one or more characteristics of a pin illustrated in FIG. 5A in some embodiments.

FIG. 5E illustrates another approach for checking or preparing data of a layout based on one or more characteristics of a pin illustrated in FIG. 5A in some embodiments. It is assumed that routing for pin 502A is to observe an on-track design rule that requires an interconnect be aligned with or intersect a track. More specifically, the original pin 502A may be moved in this example. In these embodiments, if it is determined that track 504E within the set of tracks 500A is closest to pin 502A, the data checking or preparation process or module may move pin 502A along the boundary 506E to the new location 502E such that the new pin at 502E intersects or is aligned with track 504E.

Figure 5F:
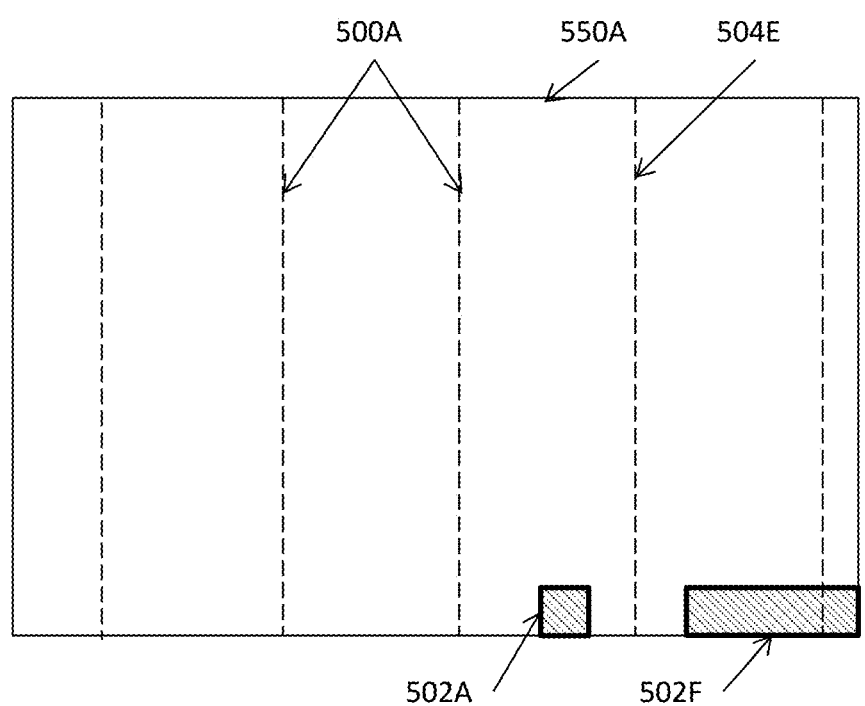
FIGS. 5F-G illustrate an example of the application of the process of checking or preparing data of a layout based on one or more characteristics of a pin illustrated in FIG. 5E in some embodiments.
Figure 5G:
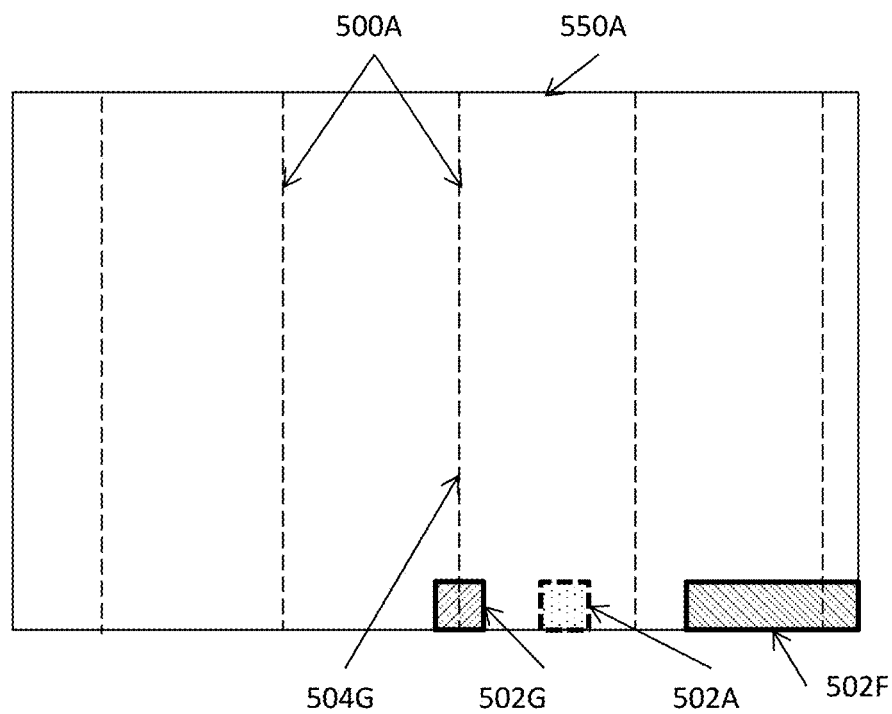

FIGS. 5F-G illustrate an example of the application of the process of checking or preparing data of a layout based on one or more characteristics of a pin illustrated in FIG. 5E. It is also assumed that routing for pin 502A is to observe an on-track design rule that requires an interconnect be aligned with or intersect a track. In this specific example, if the portion of the layout includes a shape 502F in the location as shown relative to the original pin 502A, and if the spacing between the left end of the shape 502F and track 504E causes a violation of one or more design rules (e.g., a minimum spacing rule), the data checking and data preparation process or module may not move the original pin 502A to the new location at the intersection of track 504E and the bottom of the boundary 550A as illustrated in FIG. 5E. Rather, the data check or data preparation process or module may select the next closest track 504G and to move the original pin 502A to the new location at the intersection of track 504G and the bottom of the original boundary 550A to form the new pin 502G as shown in FIG. 5G.

Figure 5H:
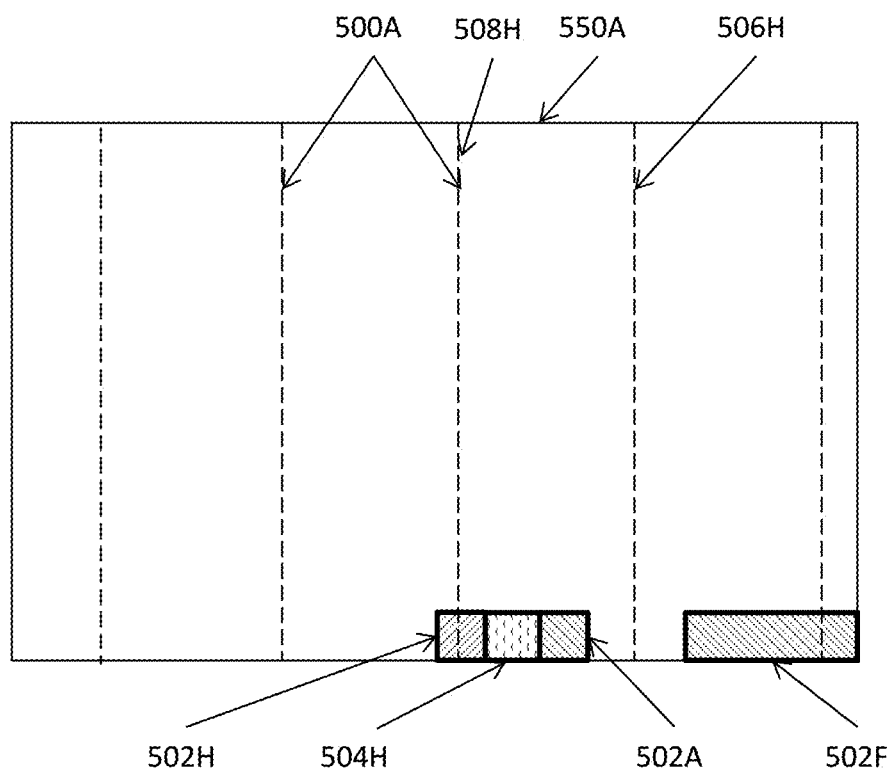
FIG. 5H illustrates a limitation for checking or preparing data of a layout based on one or more characteristics of a pin illustrated in FIGS. 5E-F in some embodiments.

FIG. 5H illustrates a limitation for checking or preparing data of a layout based on one or more characteristics of a pin illustrated in FIGS. 5E-F in some embodiments. It is assumed that routing for pin 502A is to observe an on-track design rule that requires an interconnect be aligned with or intersect a track. It is further assumed that the presence of shape 502F will cause a violation of one or more design rules if a pin is created at the intersection of track 506H and the bottom of the boundary 550A. Unlike the example illustrated in FIG. 5E, it is determined that pin 502A may not be moved. In this example, the data checking or data preparation process or module may maintain the original pin 502A in its original location and create a new pin 502H at the intersection of the next closest track 508H and the bottom of the original boundary 550A. The process or module may further connect the original pin 502A and the new pin 502H with the interconnect 504H as illustrated in FIG. 5H. During physical implementation for the original boundary pin 502A, the method or system now refers to the new boundary pin 502H which is electrically connected to the original boundary pin 502A. Therefore, interconnections routed for the new boundary pin 502H may achieve identical or substantially similar results as interconnections routed for the original boundary pin 502A.

Figures 1, 5I:
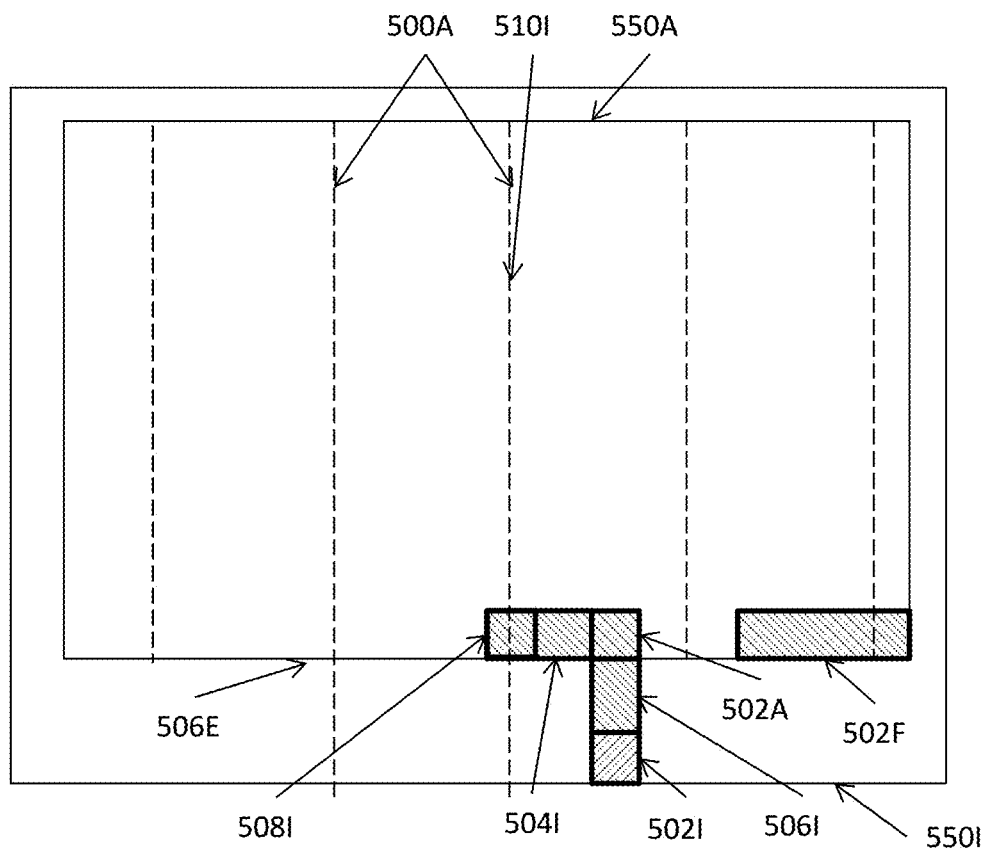
Figures 2, 5I:
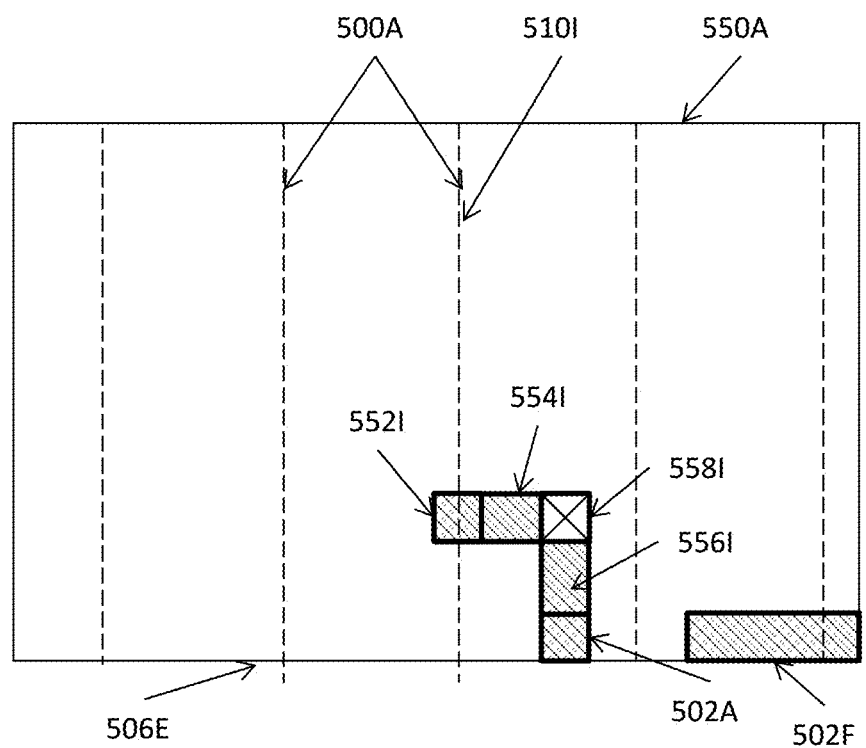

FIG. 5I-1 illustrates another approach for checking or preparing data of the exemplary layout based on one or more characteristics of a pin illustrated in FIGS. 5E-F in some embodiments. It is assumed that routing for pin 502A is to observe an on-track design rule that requires an interconnect be aligned with or intersect a track. It is further assumed that the presence of shape 502F will cause a violation of one or more design rules if a pin is created at the intersection of track 502I and the bottom of the boundary 550A. It is also assumed that the original boundary pin 502A cannot be moved, and that no new pins may be created at the intersection of track 510I and the bottom of the original boundary 550A.

In this example, the data checking and data preparation process or module may maintain the original boundary pin 502A in its original location and augment the original boundary 550A to form or create a new boundary create a new boundary 550I. With the augmented or newly created boundary 550I, the aforementioned process or module may further create a new boundary pin 502I, which is vertically aligned with the original boundary pin 502A, along the bottom of the newly created or augmented boundary 550I. The newly created boundary pin 502I may be connected to the original boundary pin 502A by adding an interconnect, wire, or shape 506I.

It shall be noted that the new boundary pin 502I and the original boundary pin 502I are vertically aligned to maintain the horizontal location of these two boundary pins in these embodiments illustrated in FIG. 5I. One of the reasons to have these two boundary pins vertically aligned is that the next higher level routing may still use the same track or even the same interconnect(s) or wire(s) to access the new boundary pin 502I, although the length(s) of these interconnect(s) or wire(s) may be different due to the vertical offset between these two boundary pins 502A and 502I. Nonetheless, the newly created boundary pin 502I may be offset both vertically and horizontally. Therefore, the vertical offset between the original boundary pin 502A and the newly created boundary pin 502I is not intended to and shall not be considered as limiting the scope of other embodiments or the scope of the claims, unless otherwise specifically recited or claimed.

In addition, the aforementioned process or module may further create another pin 508I at the intersection of track 510I and the bottom of the original boundary 550A as shown in FIG. 5I to satisfy the on-track design rule in some embodiments. An interconnect or wire 504I may be created to connect the original boundary pin 502A and the newly created pin 508I. During the physical implementation within the block, cell, or region enclosed in the boundary 550A or the newly created 550I, a routing engine may thus access pin 508I instead of the original boundary pin 502A. During the physical implementation between the block or cell enclosed within 550I, a routing engine may access the newly created boundary pin 502I.

FIG. 5I-2 illustrates another approach for checking or preparing data of the exemplary layout based on one or more characteristics of a pin illustrated in FIGS. 5E-F in some embodiments. It is assumed that routing for pin 502A is to observe an on-track design rule that requires an interconnect be aligned with or intersect a track. It is further assumed that the presence of shape 502F will cause a violation of one or more design rules if a pin is created at the intersection of track 502I and the bottom of the boundary 550A. It is also assumed that the original boundary pin 502A cannot be moved, and that no new pins may be created at the intersection of track 510I and the bottom of the original boundary 550A. Unlike the example illustrated in FIG. 5I-1, it is assumed that the original boundary 550A is not augmented or offset, and no new boundary is created.

In this example, the method or the system may identify the next closest track 510I (due to the presence of shape 520F) and create a new pin 552I intersecting or aligned with track 510I. The original pin 502A and the new pin 552I may be further connected via the shapes 554I and 556I. In some embodiments where wrong-way routing is not allowed, a via 558I may be inserted to bring the shape 554I to an adjacent routing layer. In these latter embodiments, there may need another via to jump from the adjacent routing layer back to the original layer on which the original boundary pin 502A resides.

Figures 1, 2, 5J:
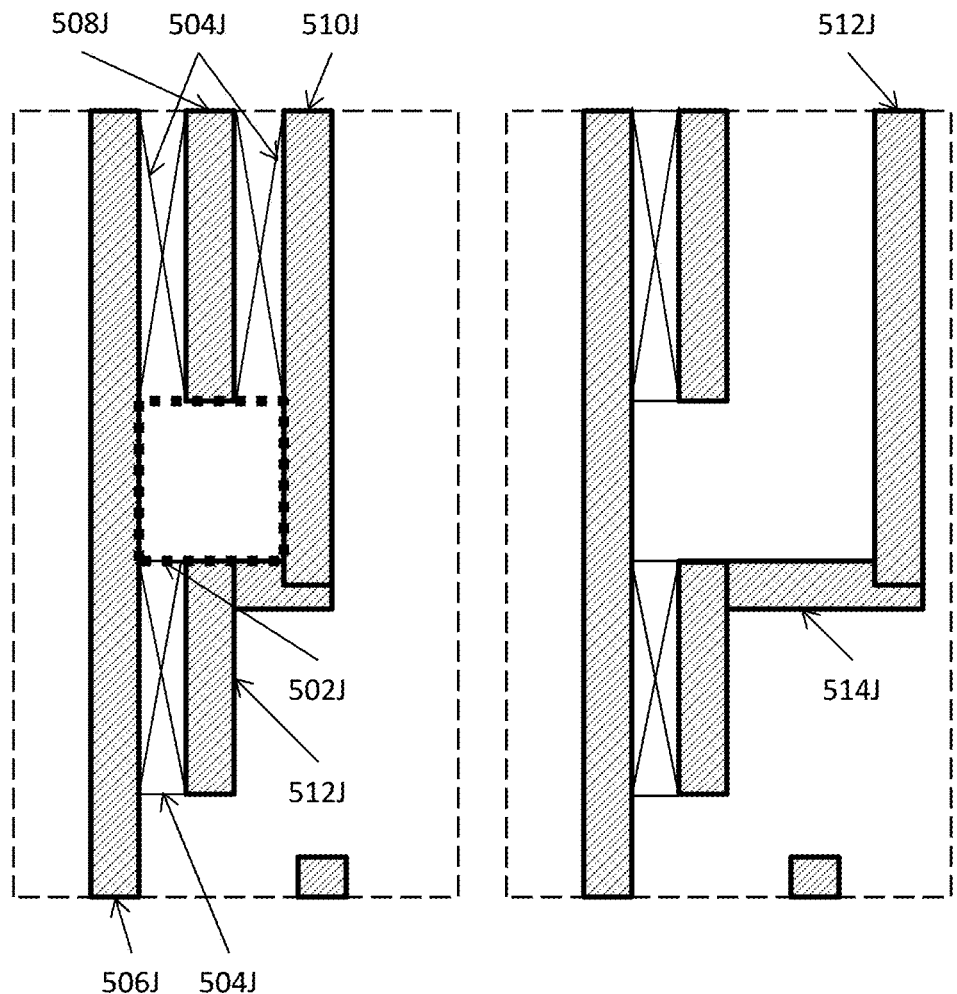

FIGS. 5J-1 and 5J-2 illustrate an approach for fixing an odd-cycle path design rule violation in a simplified layout in some embodiments. More specifically, FIG. 5J-1 illustrates a violation of an odd-cycle path (or odd loop illustrated as 502J) design rule where it is assumed that there exist an odd number of violations of the minimum spacing design rule among shapes 506J, 508J, 510J, and 512J. In this example, there are three violations of the minimum spacing design rule as indicated by the marker 504J for the violations. FIG. 5J-2 illustrates a fix for the odd loop violation by pushing shape 510J further apart to eliminate one of the three violations. In this example illustrated in FIG. 5J-2, the odd-cycle path design rule violation is fixed, and thus the resulting layout is printable with, for example, a double patterning lithography process by placing shapes 508J and 512J on one mask and shape 506J on a different mask.

Figure 5K:
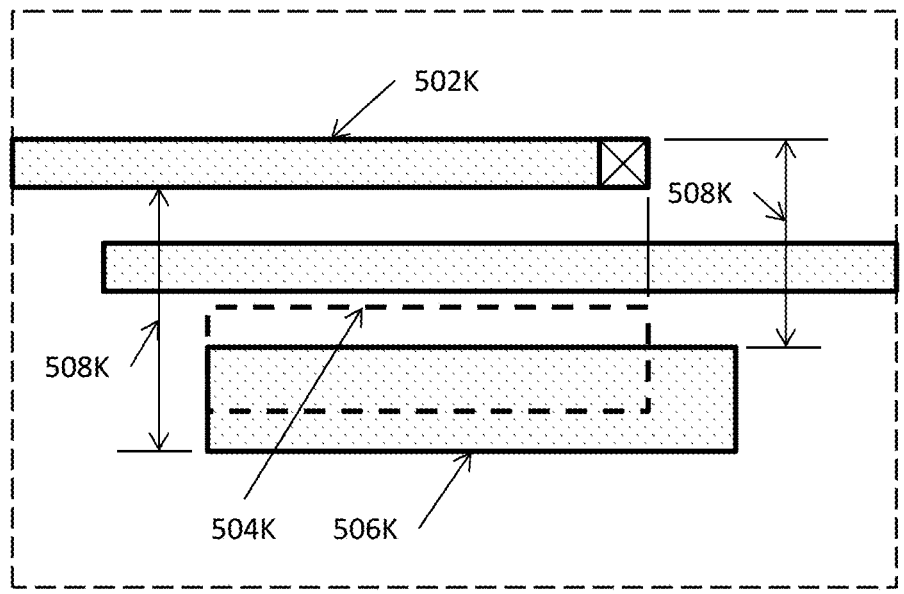
FIGS. 5K-L illustrate an approach for fixing an forbidden pitch range design rule violation in a simplified layout in some embodiments.
Figure 5L:
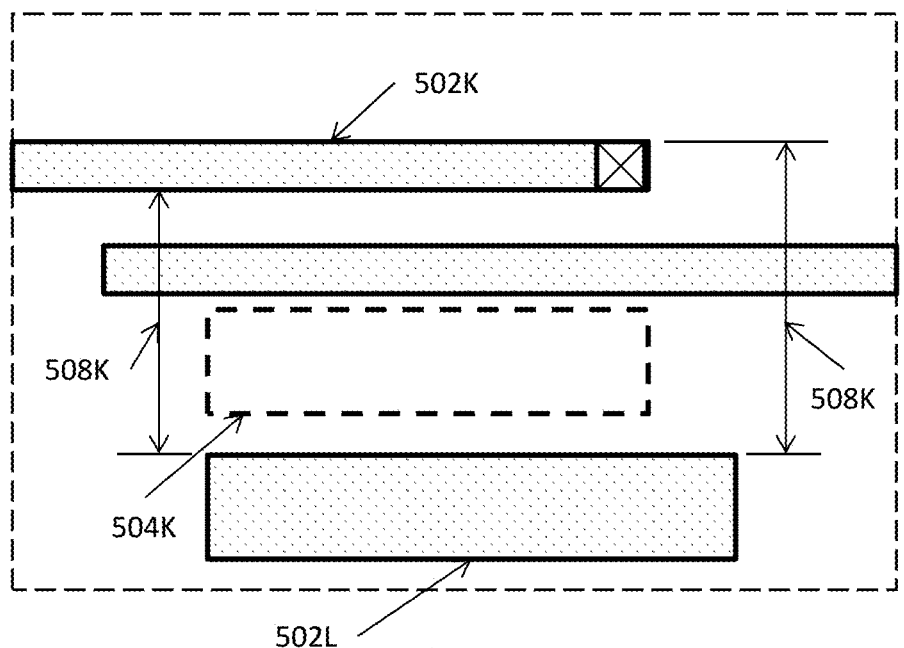

FIGS. 5K-L illustrate an approach for fixing an forbidden pitch range design rule violation in a simplified layout in some embodiments. A forbidden edge pitch range design rule sets forth a range within which a placement or routing of a shape causes violation of the rule. That is, the forbidden edge pitch design rule prescribes a range of forbidden pitches for the pitch 508K between two shapes. For example, if the layout portion illustrated in FIG. 5K includes shape 502K to which the forbidden edge pitch range design rule applies, the presence within or encroachment upon the range defined by the dashed polygon 504K by any other shapes causes a violation of this design rule. In this example, shape 506K encroaches upon the range defined by 504K and thus causes a violation of the forbidden edge range design rule. FIG. 5L illustrates a fix for the violation shown in FIG. 5K by pushing shape 506K to a new position 502L. As it may be seen from FIG. 5L, shape 502L is no longer encroaching upon the range defined by 504K and thus resolves the violation. It shall be noted that 504K is shown as a polygon having its two vertical boundary segments aligned with the left end of shape 506K and the right end of shape 502K in this specific example.

System Architecture Overview

Figure 6:
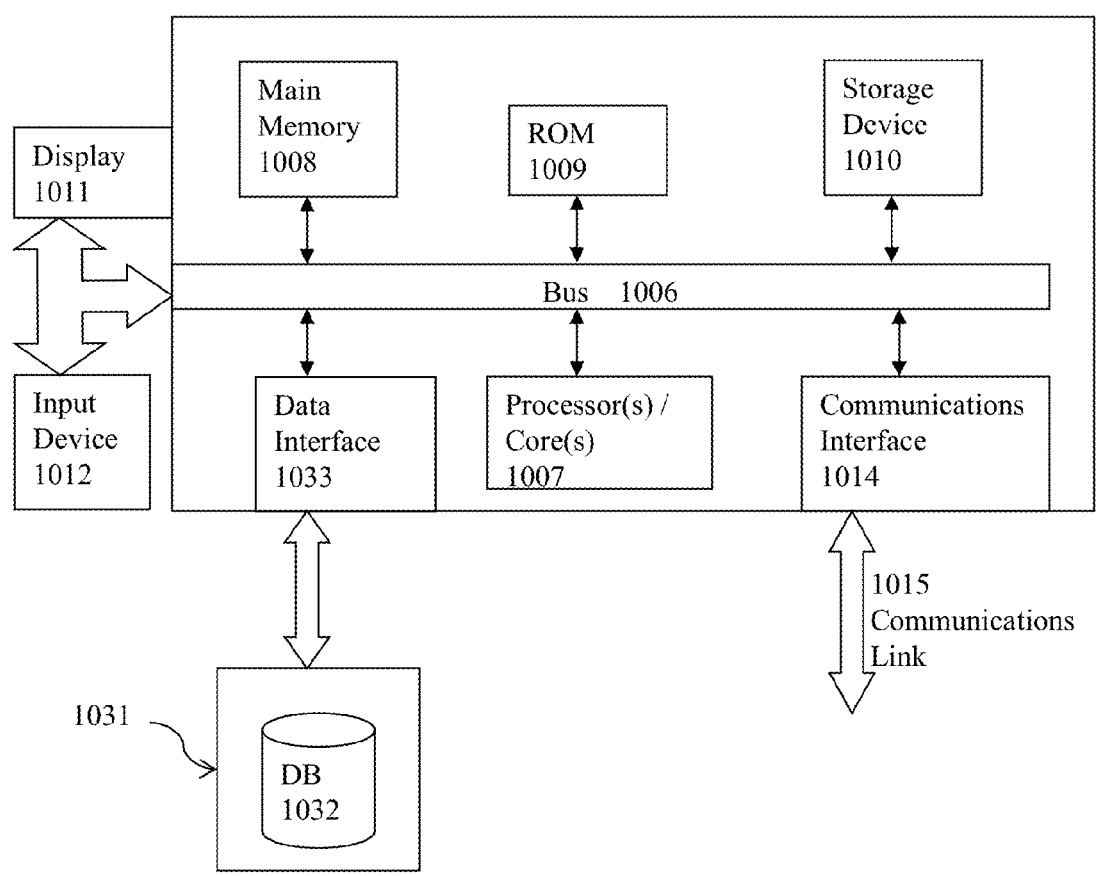
FIG. 6 illustrates a computerized system on which a method for implementing electronic design using flexible routing tracks may be implemented.

FIG. 6 illustrates a block diagram of an illustrative computing system 1000 suitable for implementing electronic designs using constraint driven techniques as described in the preceding paragraphs with reference to various figures. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment, computer system 1000 performs specific operations by one or more processor or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1007, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing physical electronic designs, comprising:
using a computing system having at least one processor or at least one processor core to perform a process, the process comprising:
identifying, with a physical implementation rule mechanism including or functioning with the at least one processor or the at least one processor core, one or more first design rules;
identifying or determining a set of tracks for a region of interest on a first layer of an electronic design based at least in part upon the one or more first design rules that govern the set of tracks and design data of a first type of circuit component designs in the electronic design;
identifying one or more second design rules; and generating at least a portion of a physical design for the region of interest using the set of tracks and the one or more second design rules, wherein the physical design of the at least a portion is correct-by-construction with respect to the one or more first design rules.

2. The computer implemented method of claim 1, wherein the physical design of the at least a portion of the region of interest automatically satisfies the one or more first design rules, without performing any design rule checking with respect to the one or more first design rules.

3. The computer implemented method of claim 1, the process further comprising:
   identifying a first portion not implemented using the set of tracks or the one or more second design rules; and
   implementing the first portion with regard to the one or more second design rules.

4. The computer implemented method of claim 1, the process further comprising:
   identifying a second portion from the first portion of the electronic design;
   identifying one or more violations of the one or more first design rules; and
   fixing at least one of the one or more violations of the one or more violations.

5. The computer implemented method of claim 1, the act of identifying or determining the set of tracks comprising:
   identifying one or more boundary pins for the region of interest;
   identifying one or more instances in the region of interest;
   identifying one or more instance pins for at least one of the one or more instances in the region of interest; and
   identifying or determining the set of tracks based at least in part upon the one or more boundary pins, the one or more instance pins, or a combination of the one or more boundary pins and the one or more instance pins.

6. The computer implemented method of claim 5, wherein the act of identifying or determining the set of tracks includes:
   identifying tracks from a greater set of grid lines, wherein the tracks are aligned with a most number of the one or more boundary pins, the one or more instance pins, or a combination of the one or more boundary pins and the one or more instance pins.

7. The computer implemented method of claim 5, wherein the act of identifying or determining the set of tracks includes:
   identifying a first boundary pin not intersecting or aligned with any track in the set of one or more tracks;
   determining whether the first boundary pin can be moved to another location;
   identifying one or more rules governing placement or routing for the first boundary pin; and
   identifying a first track from the set of tracks for the first boundary pin.

8. The computer implemented method of claim 7, wherein the act of identifying or determining the set of tracks includes:
   moving the first boundary pin to a new location determined based at least in part upon the first track and a boundary of the region of interest.

9. The computer implemented method of claim 7, wherein the act of identifying or determining the set of tracks includes:
   maintaining the first boundary pin in an original location;
   creating a new boundary segment by augmenting or offsetting at least an original boundary segment of the region of interest;
   creating a new boundary pin for the first boundary pin in a new location determined based at least in part upon the new boundary and the first track; and
   creating one or more interconnections electrically connecting the new boundary pin and the first boundary pin.

10. The computer implemented method of claim 7, wherein the act of identifying or determining the set of tracks includes:
    maintaining the first boundary pin in an original location;
    creating a new boundary pin for the first boundary pin in a new location determined based at least in part upon a boundary of the region of interest and the first track; and
    creating one or more interconnections electrically connecting the new boundary pin and the first boundary pin.

11. The computer implemented method of claim 5, wherein the act of identifying or determining the set of tracks includes:
    identifying a cell instance, an instance pin in the cell instance, and a boundary pin connected to the instance pin;
    identifying a third design rule governing the instance pin and the boundary pin, wherein a combination of the instance pin and the boundary pin causes a violation of the third design rule; and
    evaluating one or more options for resolving the violation of the third design rule.

12. The computer implemented method of claim 11, wherein the act of identifying or determining the set of tracks includes at least one of:
    moving the instance pin to a new instance pin location without moving the cell instance;
    moving the cell instance to a new cell instance location;
    moving the boundary pin to a new boundary pin location;
    inserting one or more vias for the instance pin; and
    flagging the instance pin.

13. A system for implementing physical electronic designs, comprising:
    a computing system having at least one processor or at least one processor core that is to:
    identify, with a physical implementation rule mechanism including or functioning with the at least one processor or the at least one processor core, one or more first design rules;
    identify or determine a set of tracks for a region of interest on a first layer of an electronic design based at least in part upon the one or more first design rules that govern the set of tracks and design data of a first type of circuit component designs in the electronic design;
    identify one or more second design rules; and
    generate at least a portion of a physical design for the region of interest using the set of tracks and the one or more second design rules, wherein the physical design of the at least a portion is correct-by-construction with respect to the one or more first design rules.

14. The system of claim 13, wherein the at least one processor or at least one processor core is further to:
    identify a first portion not implemented using the set of tracks or the one or more second design rules; and
    implement the first portion with regard to the one or more second design rules.

15. The system of claim 13, wherein the at least one processor or at least one processor core is further to:
    identify a second portion from the first portion of the electronic design;
    identify one or more violations of the one or more first design rules; and
    fix at least one of the one or more violations of the one or more violations.

16. The system of claim 13, wherein the at least one processor or at least one processor core that is to identify or determine the set of tracks is further to:
- identify one or more boundary pins for the region of interest;
- identify one or more instances in the region of interest;
- identify one or more instance pins for at least one of the one or more instances in the region of interest;
- identify or determine the set of tracks based at least in part upon the one or more boundary pins, the one or more instance pins, or a combination of the one or more boundary pins and the one or more instance pins; and
- identify tracks from a greater set of grid lines, wherein the tracks are aligned with a most number of the one or more boundary pins, the one or more instance pins, or a combination of the one or more boundary pins and the one or more instance pins.

17. The system of claim 16, wherein the at least one processor or at least one processor core that is to identify or determine the set of tracks is further to:
- identify a first boundary pin not intersecting or aligned with any track in the set of one or more tracks;
- determine whether the first boundary pin can be moved to another location;
- identify one or more rules governing placement or routing for the first boundary pin; and
- identify a first track from the set of tracks for the first boundary pin.

18. The system of claim 16, wherein the at least one processor or at least one processor core that is to identify or determine the set of tracks is further to:
- identify a cell instance, an instance pin in the cell instance, and a boundary pin connected to the instance pin;
- identify a third design rule governing the instance pin and the boundary pin, wherein a combination of the instance pin and the boundary pin causes a violation of the third design rule; and
- evaluate one or more options for resolving the violation of the third design rule.

19. The system of claim 17, wherein the at least one processor or at least one processor core that is to identify or determine the set of tracks is further to:
- maintain the first boundary pin in an original location;
- create a new boundary segment by augmenting or offsetting at least an original boundary segment of the region of interest;
- create a new boundary pin for the first boundary pin in a new location determined based at least in part upon the new boundary and the first track; and
- create one or more interconnections electrically connecting the new boundary pin and the first boundary pin.

20. The system of claim 17, wherein the at least one processor or at least one processor core that is to identify or determine the set of tracks is further to:
- maintain the first boundary pin in an original location;
- create a new boundary pin for the first boundary pin in a new location determined based at least in part upon a boundary of the region of interest and the first track; and
- create one or more interconnections electrically connecting the new boundary pin and the first boundary pin.

21. The system of claim 17, wherein the at least one processor or at least one processor core that is to identify or determine the set of tracks is further to:
- identify a cell instance, an instance pin in the cell instance, and a boundary pin connected to the instance pin;
- identify a third design rule governing the instance pin and the boundary pin, wherein a combination of the instance pin and the boundary pin causes a violation of the third design rule; and
- evaluate one or more options for resolving the violation of the third design rule.

22. The system of claim 21, wherein the at least one processor or at least one processor core that is to identify or determine the set of tracks is further to:
- move the instance pin to a new instance pin location without moving the cell instance;
- move the cell instance to a new cell instance location;
- move the boundary pin to a new boundary pin location;
- insert one or more vias for the instance pin; and
- flag the instance pin.

23. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing physical electronic designs, the set of acts comprising:
- identifying, with a physical implementation rule mechanism including or functioning with the at least one processor or the at least one processor core, one or more first design rules;
- identifying or determining a set of tracks for a region of interest on a first layer of an electronic design based at least in part upon the one or more first design rules that govern the set of tracks and design data of a first type of circuit component designs in the electronic design;
- identifying one or more second design rules; and
- generating at least a portion of a physical design for the region of interest using the set of tracks and the one or more second design rules, wherein the physical design of the at least a portion is correct-by-construction with respect to the one or more first design rules.

24. The article of manufacture of claim 23, the set of acts further comprising:
- identifying a first portion not implemented using the set of tracks or the one or more second design rules; and
- implementing the first portion with regard to the one or more second design rules.

25. The article of manufacture of claim 23, the set of acts further comprising:
- identifying a second portion from the first portion of the electronic design;
- identifying one or more violations of the one or more first design rules; and
- fixing at least one of the one or more violations of the one or more violations.

26. The article of manufacture of claim 23, the act of identifying or determining the set of tracks comprising:
- identifying one or more boundary pins for the region of interest;
- identifying one or more instances in the region of interest;
- identifying one or more instance pins for at least one of the one or more instances in the region of interest; and
- identifying or determining the set of tracks based at least in part upon the one or more boundary pins, the one or more instance pins, or a combination of the one or more boundary pins and the one or more instance pins.

27. The article of manufacture of claim 26, wherein the act of identifying or determining the set of tracks includes:
- identifying tracks from a greater set of grid lines, wherein the tracks are aligned with a most number of the one or more boundary pins, the one or more instance pins, or a combination of the one or more boundary pins and the one or more instance pins.

28. The article of manufacture of claim 26, wherein the act of identifying or determining the set of tracks includes:
   identifying a first boundary pin not intersecting or aligned with any track in the set of one or more tracks;
   determining whether the first boundary pin can be moved to another location;
   identifying one or more rules governing placement or routing for the first boundary pin; and
   identifying a first track from the set of tracks for the first boundary pin.

29. The article of manufacture of claim 28, wherein the act of identifying or determining the set of tracks includes:
   moving the first boundary pin to a new location determined based at least in part upon the first track and a boundary of the region of interest.

30. The article of manufacture of claim 28, wherein the act of identifying or determining the set of tracks includes:
   maintaining the first boundary pin in an original location;
   creating a new boundary segment by augmenting or offsetting at least an original boundary segment of the region of interest;
   creating a new boundary pin for the first boundary pin in a new location determined based at least in part upon the new boundary and the first track; and
   creating one or more interconnections electrically connecting the new boundary pin and the first boundary pin.

31. The article of manufacture of claim 28, wherein the act of identifying or determining the set of tracks includes:
   maintaining the first boundary pin in an original location;
   creating a new boundary pin for the first boundary pin in a new location determined based at least in part upon a boundary of the region of interest and the first track; and
   creating one or more interconnections electrically connecting the new boundary pin and the first boundary pin.

32. The article of manufacture of claim 26, wherein the act of identifying or determining the set of tracks includes:
   a first set of acts, comprising:
      identifying a cell instance, an instance pin in the cell instance, and a boundary pin connected to the instance pin;
      identifying a third design rule governing the instance pin and the boundary pin, wherein a combination of the instance pin and the boundary pin causes a violation of the third design rule; and
      evaluating one or more options for resolving the violation of the third design rule; or
   a second set of acts, comprising:
      moving the instance pin to a new instance pin location without moving the cell instance;
      moving the cell instance to a new cell instance location;
      moving the boundary pin to a new boundary pin location;
      inserting one or more vias for the instance pin; and
      flagging the instance pin.

* * * * *